United States Patent [19]

Menich et al.

[11] Patent Number: 4,726,050

[45] Date of Patent: Feb. 16, 1988

[54] SCANNING RECEIVER ALLOCATION METHOD AND APPARATUS FOR CELLULAR RADIOTELEPHONE SYSTEMS

[75] Inventors: Barry J. Menich, Chicago; Daniel R. Tayloe, Rolling Meadows; Dennis R. Schaeffer, Buffalo Grove; Victor Graziano, Oak Park; Valy Lev, Schaumburg, all of Ill.

[73] Assignee: Motorola, Inc., Schaumburg, Ill.

[21] Appl. No.: 73,916

[22] Filed: Jul. 13, 1987

Related U.S. Application Data

[63] Continuation of Ser. No. 830,166, Feb. 18, 1986, abandoned.

[51] Int. Cl.⁴ .............................................. H04Q 7/04
[52] U.S. Cl. .................................. 379/60; 455/33; 379/63
[58] Field of Search ................ 379/58, 59, 60, 63; 455/33, 54, 62

[56] References Cited

U.S. PATENT DOCUMENTS

| | | | |
|---|---|---|---|
| 3,537,011 | 10/1970 | Escoula | 325/304 |
| 3,663,762 | 5/1972 | Joel, Jr. | 455/33 |
| 3,764,915 | 10/1973 | Cox et al. | 325/53 |
| 3,860,872 | 1/1975 | Richardson et al. | 455/33 |
| 3,906,166 | 9/1975 | Cooper et al. | 455/33 |
| 4,101,836 | 7/1978 | Craig et al. | 325/302 |
| 4,128,740 | 12/1978 | Graziano | 379/59 |
| 4,144,411 | 3/1979 | Frenkiel | 379/60 |
| 4,144,496 | 3/1979 | Cunningham et al. | 325/53 |
| 4,317,229 | 2/1982 | Craig et al. | 455/227 |
| 4,365,347 | 12/1982 | Otsuka et al. | 455/179 |
| 4,369,520 | 1/1983 | Cerny, Jr. et al. | 455/137 |
| 4,392,242 | 7/1983 | Kai | 455/33 |
| 4,475,010 | 10/1984 | Huensch et al. | 379/60 |
| 4,479,246 | 10/1984 | Young | 455/50 |
| 4,481,670 | 11/1984 | Freeburg | 455/33 |
| 4,485,486 | 11/1984 | Webb et al. | 455/33 |
| 4,491,966 | 1/1985 | Morcerf et al. | 455/32 |
| 4,525,861 | 6/1985 | Freeburg | 455/33 |
| 4,549,311 | 10/1985 | McLaughlin | 455/227 |
| 4,608,711 | 8/1986 | Goldman | 455/33 |
| 4,633,509 | 12/1986 | Scheinert | 455/33 |

FOREIGN PATENT DOCUMENTS 56-58339  5/1981  Japan .

OTHER PUBLICATIONS

N. Ehrlich et al., "Cell Site Hardware", Bell System Technical Journal, vol. 58, No. 1, Jan. 1979.
Motorola, Inc., "Dyna T*A*C TM System Description", Instruction Manual No. 68P81150E01-0, Mar. 15, 1983, pp. 14-24.

Primary Examiner—Robert Lev
Attorney, Agent, or Firm—Raymond A. Jenski; Rolland R. Hackbart

[57] ABSTRACT

A method and apparatus for utilizing voice channel transceivers as temporary scanning receivers in a handoff event for a cellular radiotelephone system is disclosed. Voice channel transceiver identifications are stored in link lists according to priority, sectorization, and last use. When a signal strength measurement is required, those cell sectors having available voice channel transceivers are identified and a table providing optimum transceiver selection is utilized to select those voice channel transceivers which will make the signal strength measurement.

18 Claims, 19 Drawing Figures

—PRIOR ART—

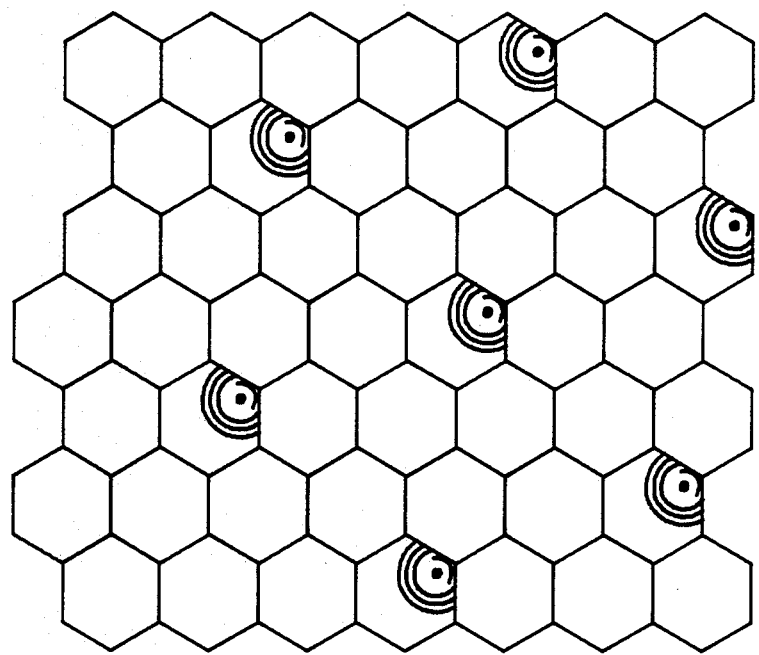
Fig. 2 —PRIOR ART—
Fig. 3 —PRIOR ART—
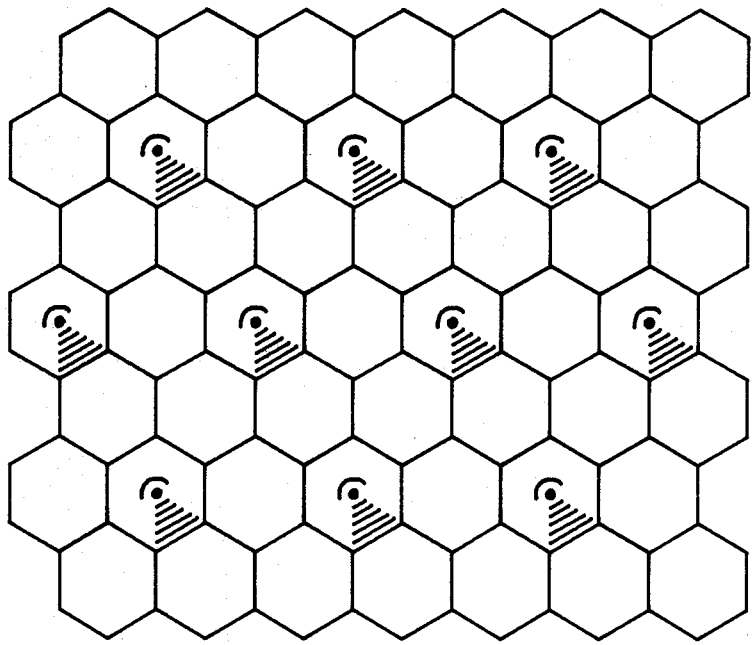

— PRIOR ART —

SCANNING RECEIVER ALLOCATION METHOD AND APPARATUS FOR CELLULAR RADIOTELEPHONE SYSTEMS

This is a continuation of application Ser. No. 830,166, filed Feb. 18, 1986 now abandoned.

BACKGROUND OF THE INVENTION

Reference is made to three copending applications U.S. patent application Nos. 829,872, "Method and Apparatus for Signal Strength Measurement and Antenna Selection in Cellular Radiotelephone Systems", by Menich et al.; 830,145, "Improved Cellular Radiotelephone Land Station", by Atkinson et al.; and 830,390, "Interface Method and Apparatus for a Cellular System Site Controller", by Menich et al.) filed on Feb. 18, 1986 and containing related subject matter. The present invention generally relates to the fixed equipment of radiotelephone communication systems and more specifically relates to a method and apparatus for allocating fixed equipment voice channel transceivers to a temporary scanning receiver function for a cellular radiotelephone system such that the amount of fixed equipment and the quantity of data exchanged between equipment may be minimized.

Mobile radiotelephone service has been in use for some time and traditionally has been characterized by a central site transmitting with high power to a limited number of mobile or portable units in a large geographic area. Mobile or portable transmissions, due to their lower transmission power, were generally received in previous systems by a network of receivers remotely located from the central site and the received transmission was subsequently returned to the central site for processing. In previous systems only a limited number of radio channels were available, thus limiting the number of radiotelephone conversations in an entire city to the limited number of channels available.

Modern cellular radiotelephone systems have a comparatively large number of radio channels available which, further, can be effectively multiplied by reuse of the channels in a metropolitan area by dividing the radio coverage area into smaller coverage areas (cells) using low power transmitters and coverage restricted receivers. Such cellular systems are further described in U.S. Pat. Nos. 3,906,166-Cooper et al.; 4,485,486-Webb et al.; and 4,549,311-McLaughlin, each assigned to the assignee of the present invention. The limited coverage area enables the channel frequencies used in one cell to be reused in another cell geographically separated according to a predetermined plan, such as a seven cell repeating omnidirectionally illuminated cell pattern shown in FIG. 1. In this pattern, radio frequency energy is omnidirectionally transmitted from and received by a plurality of centrally located fixed stations and reuse of frequencies is accomplished in a pattern of cells such as that shown shaded in FIG. 1.

An alternative cellular pattern, FIG. 2, depicts a corner illuminated cell system in which 120° antennas are employed to illuminate the interior of a cell from three of the vertices of a hexagonal cell. (Although cell systems are conventionally shown as regular hexagonal patterns, such regularity is rarely achieved in practice).

Another pattern, FIG. 3, depicts a center illuminated cell system in which the cells are further subdivided into sectors. The sectors are illuminated by 60° antennas as illustrated in FIG. 3. A center illuminated sector cell system is further described in U.S. Pat. No. 4,128,740-Graziano and assigned to the assignee of the present intention. Thus, a large number of channels can be made available in a metropolitan area and the service provided thereby can appear to be identical to a standard wire line telephone.

A cell system typically utilizes one duplex frequency pair channel in each cell (a signalling channel) to receive requests for service from mobiles and portables, to call selected mobiles or portables and to instruct the mobiles or portables to tune to another channel where a conversation may take place. This signalling channel is continuously assigned the task of receiving and transmitting data to control the actions of the mobile and portable radios. If the cell is sectorized as shown in FIG. 3, specialized receivers have been developed to enable the inputs from six 60° antennas to be combined for instantaneous reception over the sectorized cell coverage area. One such specialized receiver is described in U.S. Pat. No. 4,369,520-Cerny, Jr., et al., assigned to the assignee of the present invention.

Since the cells may be of relatively small size, the likelihood of a mobile or portable travelling between sectors or out of one cell and into another cell is high. The process of switching the established call from one sector or from one cell to another is known as handoff. Handoff previously has required specialized receiving equipment such as a "scanning" receiver which can be instructed to tune to any of the channels in use in any of the sectors of the cell to measure the signal strength of each active mobile or portable. If the measured signal strength is below a predetermined level, cellular control equipment determines the availability of other channels in other sectors of the same cell or in neighboring cells and composes an instruction to the mobile or portable commanding it to tune to the new channel.

The utilization of a separate scanning receiver requires additional receiving equipment (which in most applications must be made redundant because of the critical nature of its function) having a single purpose measurement of received signal strength on a radio channel upon command by the cellular control equipment. This additional receiving equipment adds to the complexity and cost of the fixed equipment at a cell site.

SUMMARY OF THE INVENTION

Therefore, it is an object of the present invention to reduce the amount of fixed site receiving equipment.

It is a further object of the present invention to supplement or replace the single purpose scanning receiver with a more general purpose voice channel transceiver which can be called upon to make signal strength measurements when so commanded.

It is a further object of the present invention to select a general purpose voice channel transceiver to temporarily become a scanning receiver in a manner which least affects the performance of the fixed equipment of a cellular radiotelephone system.

Accordingly, these and other objects are achieved in the method and apparatus of the present invention. This invention determines which voice channel transceivers may be available for use as a temporary scanning receiver in a geographical area not serving a remote telephone unit which requires a handoff. A selection of at least one voice channel transceiver is made and that selected at least one voice channel transceiver is instructed to tune to the radio frequency used by the remote telephone unit requiring handoff. Once tuned to the frequency, the selected at least one transceiver measures the received signal strength.

BRIEF DESCRIPTION OF THE DRAWINGS

FIG. 2 is a representation of the geographic area covered by a conventional corner illuminated cell system.

FIG. 3 is a representation of the geographic area covered by a conventional center illuminated sector cell system.

DETAILED DESCRIPTION OF THE PREFERRED EMBODIMENT

Figure 1:
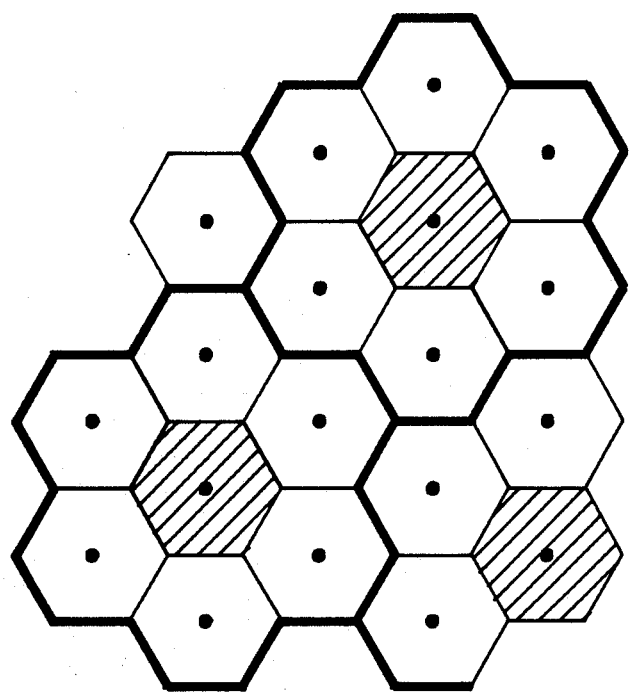
FIG. 1 is a representation of the geographic area covered by a conventional omnidirectionally illuminated cell system.
Figure 4:
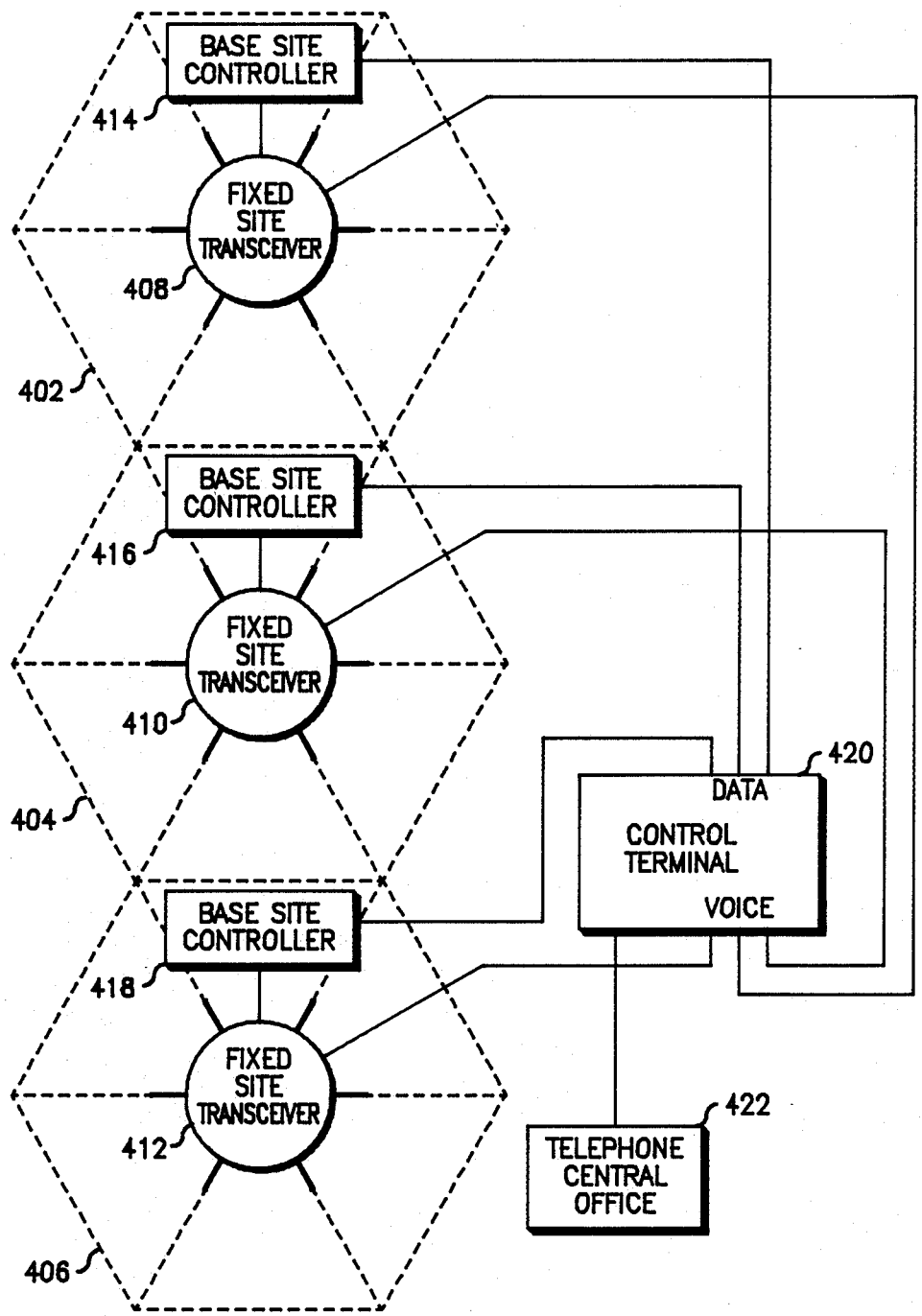
FIG. 4 is a basic block diagram of the relationships of the equipment which would be employed in a conventional center illuminated sector cell system.

Referring now to FIG. 4, there is illustrated a cellular radiotelephone communications system of the type which may particularly benefit from the invention herein described. The illustration of FIG. 4 shows three center illuminated sector cells of the type previously described in conjunction with FIG. 3 but with more detail regarding the type of equipment to be found in a sector cell system. Although the present invention will be described with particularity for the center illuminated sector cell system, it is obvious that a person skilled in the art may be able to apply the essence of the present invention to other types of cellular configurations such as those shown in FIG. 2 and FIG. 1.

As illustrated in FIG. 4, the geographical area is subdivided into cells 402, 404, and 406 which are illuminated with radio frequency energy from fixed site transceivers 408, 410, and 412, respectively. The fixed site transceivers are conventionally controlled by base site controllers 414, 416, and 418 as illustrated. These base site controllers are each coupled by data and voice links to a radiotelephone control terminal 420 which may be similar to the terminals described in U.S. Pat. Nos. 3,663,762; 3,764,915; 3,819,872; 3,906,166; and 4,268,722. These data and voice links may be provided by dedicated wire lines, pulse code modulated carrier lines, microwave radio channels, or other suitable communication links. Control terminal 420 is, in turn, coupled to the switched telephone network via a conventional telephone central office 422 for completing telephone calls between mobile and portable radiotelephones and landline telephones.

Figure 5:
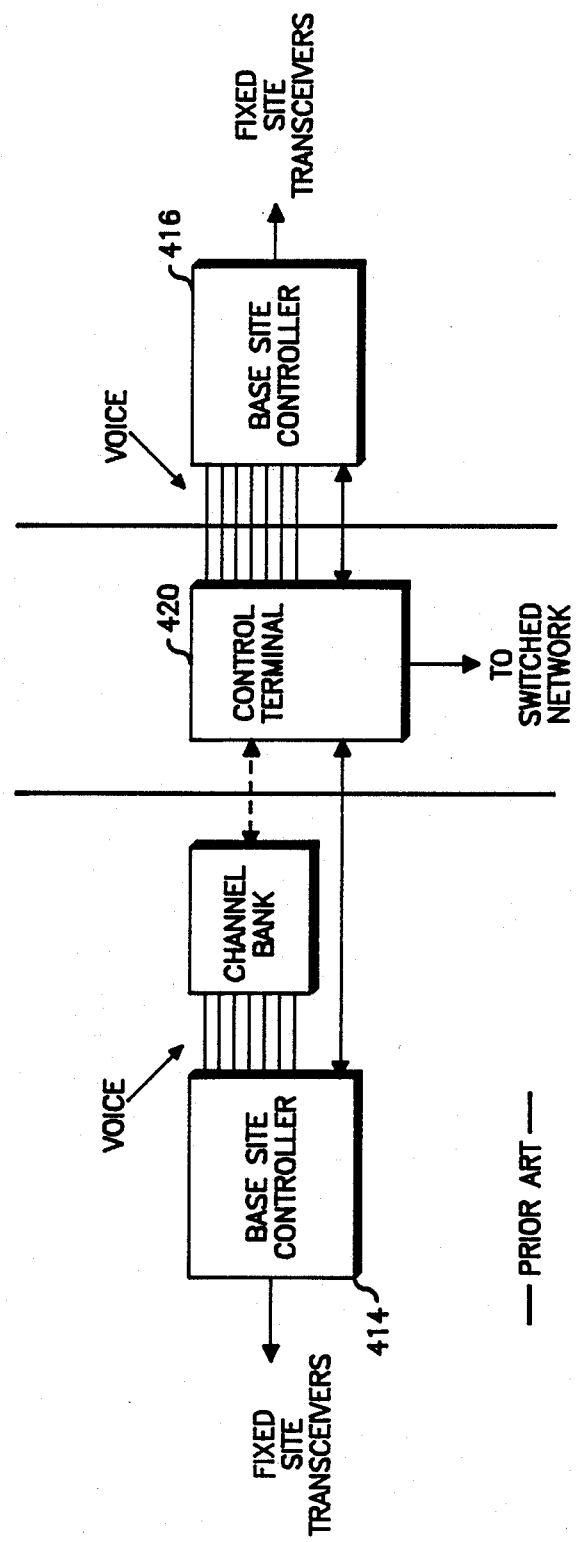
FIG. 5 is a block diagram of the interconnection between a control terminal and the base site controllers of a conventional cell system.

The interconnection between control terminal 420 and the base site controllers (BSCs) is further shown in FIG. 5. The per-channel interconnection may be on a line per channel basis such as shown between control terminal 420 and BSC 416 or the interconnection may be on a PCM group basis such as shown between control terminal 420 and BSC 414. Either type of interconnection is well known in the art. A separate data line (which may be a standard telephone line or other communications link capable of carrying 4800 baud data) is extended between the control terminal 420 and each BSC under its control.

Each of the fixed site transceivers 408, 410, and 412 includes a plurality of transmitters and receivers for operating on at least one duplex signalling channel and a plurality of duplex voice channels. One conventional system employs transmitters and receivers of the type described in Motorola Instruction Manual No. 68P81060E30, published by Motorola Service Publications, Schaumburg, Ill., in 1982. Employing this equipment and spacing the channels in use at least 630 KHz from each other, enables the individual transmitters to be combined on a single antenna (which may be a 60° directional antenna) as illustrated in FIG. 6.

Figure 6:
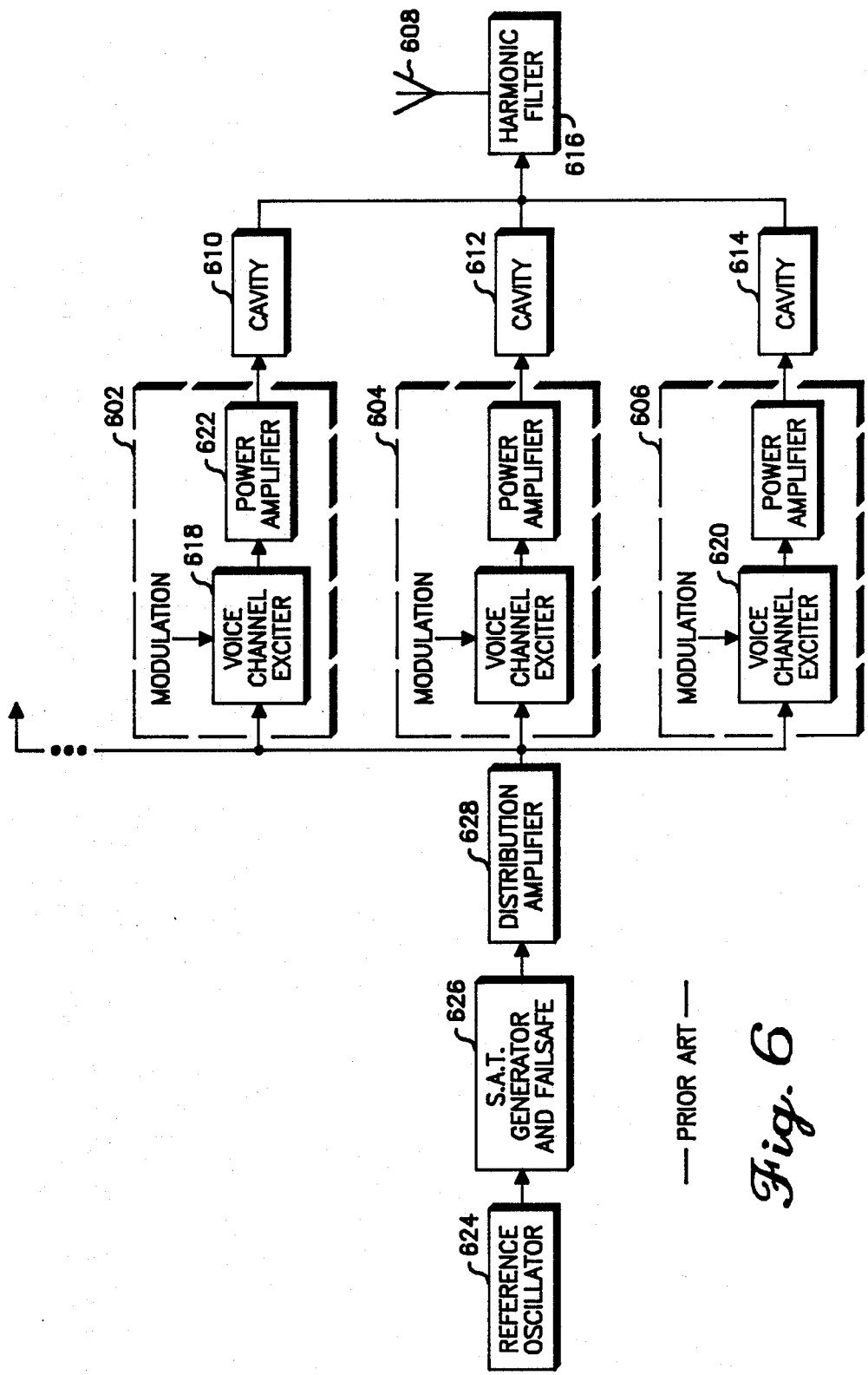
FIG. 6 is a block diagram of a conventional fixed site multi channel transmitter for a cell system.

In FIG. 6, three transmitters 602, 604, and 606 are shown connected to an antenna 608 via combining cavities 610, 612, and 614 and harmonic filter 616. Each transmitter consists of a voice channel exciter 618 for voice channels or a signalling channel exciter 620 for a signalling channel and a power amplifier 622. Each of the conventional transmitters shares a common reference oscillator 624, a supervisory audio tone (SAT) generator and failsafe circuit 626, and a distribution amplifier 628.

Figure 7:
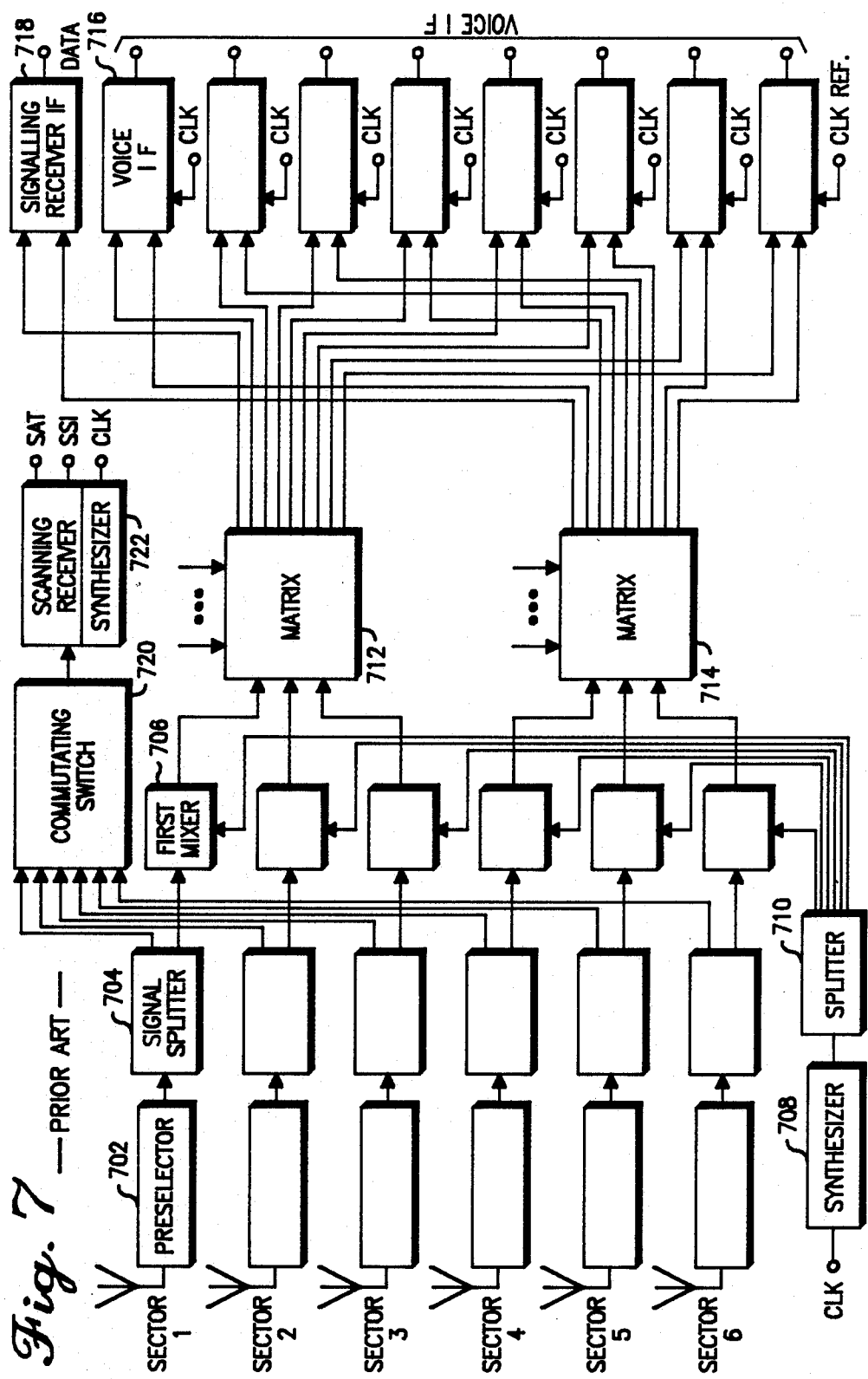
FIG. 7 is a block diagram of a conventional fixed site receiver system which may be employed in an omnidirectionally illuminated cell system.
Figure 8:
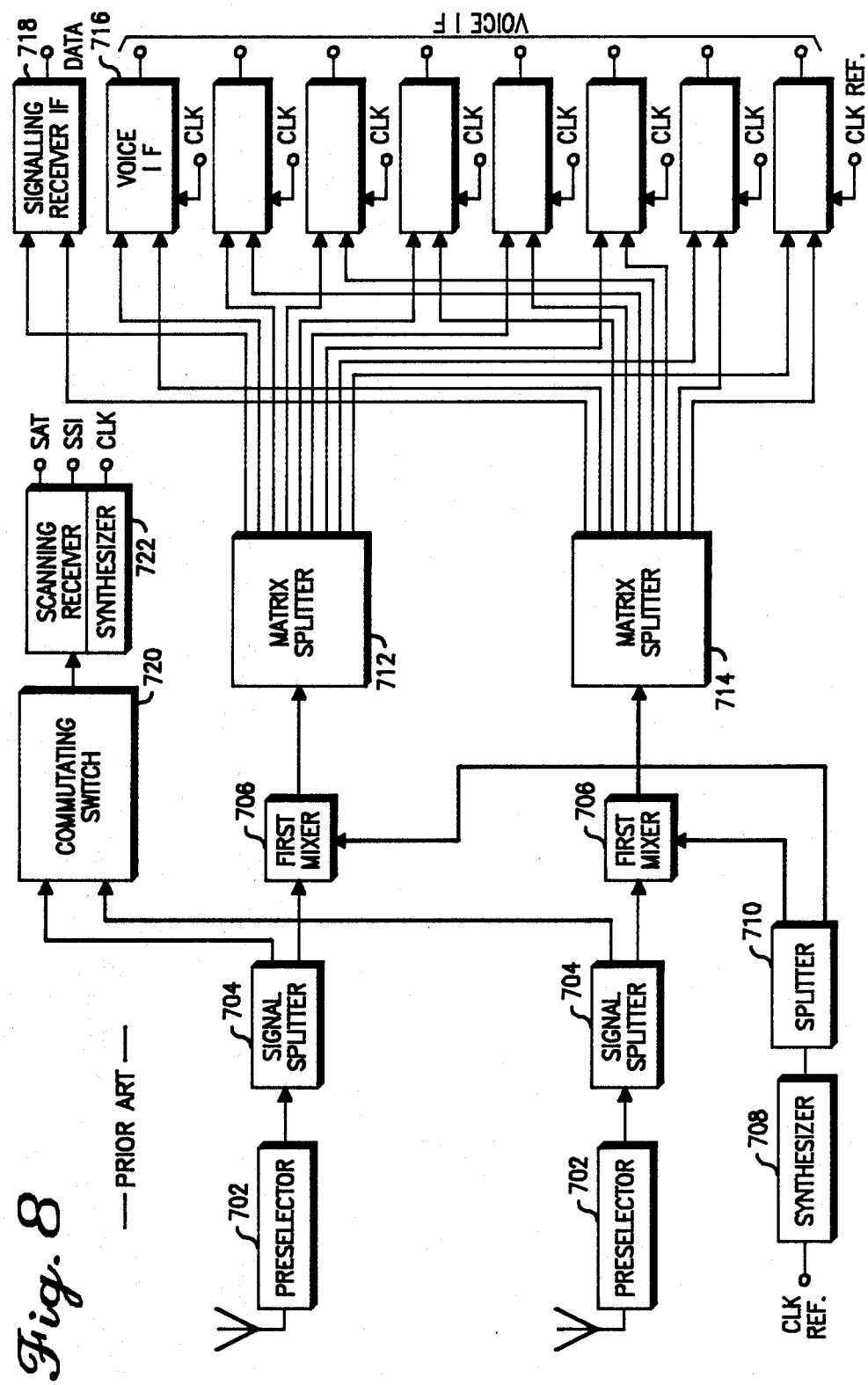
FIG. 8 is a block diagram of a conventional fixed site receiver system which may be employed in a center illuminated sector cell system.

The conventional receiving system is designed in modular groups of eight voice channel receivers, a signalling receiver, and a scanning receiver. Two possible system configurations are shown in FIGS. 7 and 8. Considering first the six sector receive system shown in FIG. 7, it can be seen that a set of broadband preselectors 702, signal splitters 704 and first mixers 706 convert each sector antenna input to an intermediate frequency (IF) for use by the remainder of the receivers. Local oscillator input to first mixers 706 is provided by a common synthesizer 708 and distributed to each of the first mixers 706 by splitter 710. Two switch matrices, matrix 712 and matrix 714 connect a pair of antennas corresponding to adjacent sectors to each of the voice receiver IFs 716 and the signalling receiver IF 718. A commutating RF switch 720 is connected to each of the signal splitters 704 and steps the scanning receiver 722 through each of the six sector antennas.

An omnidirectional receive system is shown in FIG. 8 and is a conventional subset of the sector receive system of FIG. 7. Two omnidirectional antennas encompass the entire 360° coverage area within the cell. The down converted signal from each of the antennas and output from first mixers 706 are split among each of the voice IF receivers 716 and the signalling receiver 718 by matrix splitters 812 and 814. Further, the scanning receiver 722 is toggled between the two antennas by commutating switch 820.

Figure 9:
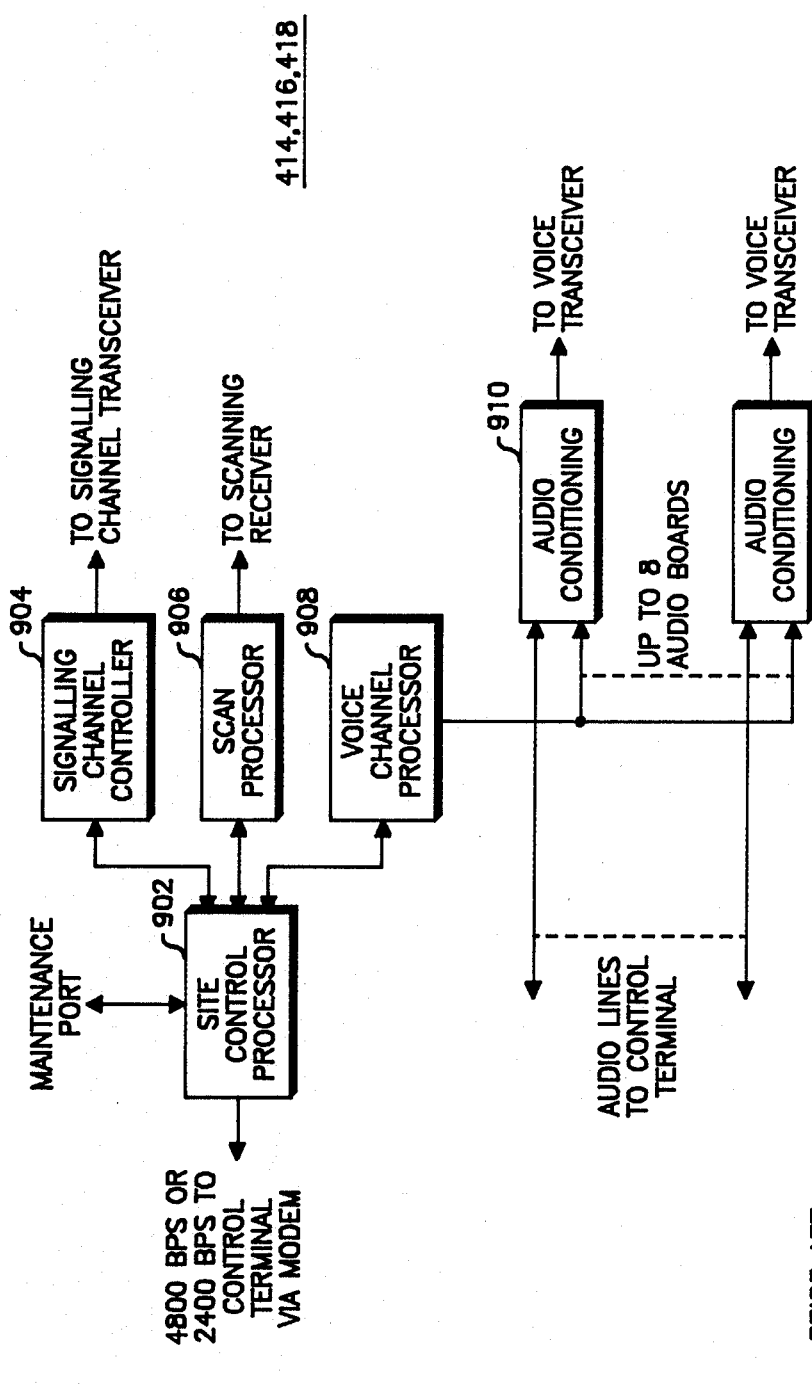
FIG. 9 is a block diagram of a conventional base site controller which may be employed in a cell system.

The conventional base site controller (414, 416, or 418) is shown in more detail in the block diagram of FIG. 9. The base site controller (BSC) provides two-way subscriber remote unit (mobile and portable) signalling, voice communications, and complete control and performance monitoring of the fixed site equipment. The BSC consists of a site control processor module 902 which controls all aspects of the base site operation. The site control processor 902 contains memory storage buffers for communication with the peripheral processors 904, 906 and 908. The site control processor 902 also contains serial interface ports for communicating with other site control processors and for communicating with the control terminal 420 and an RS-232 port for connection to a maintenance terminal. A signalling channel controller peripheral 904 sends paging and overhead messages to subscriber units via the signalling channel by command of the site control processor 902. The signalling channel controller 904 also decodes and corrects data received from subscriber units. In systems using sector receive antennas, it uses information from the signalling channel receiver 718 to make an initial estimate of the subscriber units location.

The scan processor peripheral 906 measures every active subscriber unit signal strength on each receive antenna. A method and apparatus for measuring signal strength on receive antennas is further described in U.S. Pat. No. 4,485,486-Webb et al., assigned to the assignee of the present invention. It also measures the supervisory audio tone frequency of subscriber units to verify that it is making measurements on the correct subscriber unit. The scan processor 906 is capable of directing the scanning receiver 722 to any subscriber frequency and measuring any of the three supervisory audio tone frequencies. The voice channel processor peripheral 908 controls up to eight voice channel IFs and the subscriber units using them. The voice channel processor 908 interfaces to each voice channel receiver through an audio conditioning board 910. The voice channel processor 908 sends messages to subscriber units by command of the site control processor 902 and further decodes and corrects data messages from subscriber units over the appropriate voice channel. The voice control processor 908 controls voice transmitters and voice channel receive antenna selection. The audio conditioning boards 910 are employed one for each voice channel in use at a fixed site. The audio conditioning boards 910 conditions and controls the audio for connection to both the receiver and transmitter radio equipment and the telephone lines to the control terminal 420.

Figure 10:
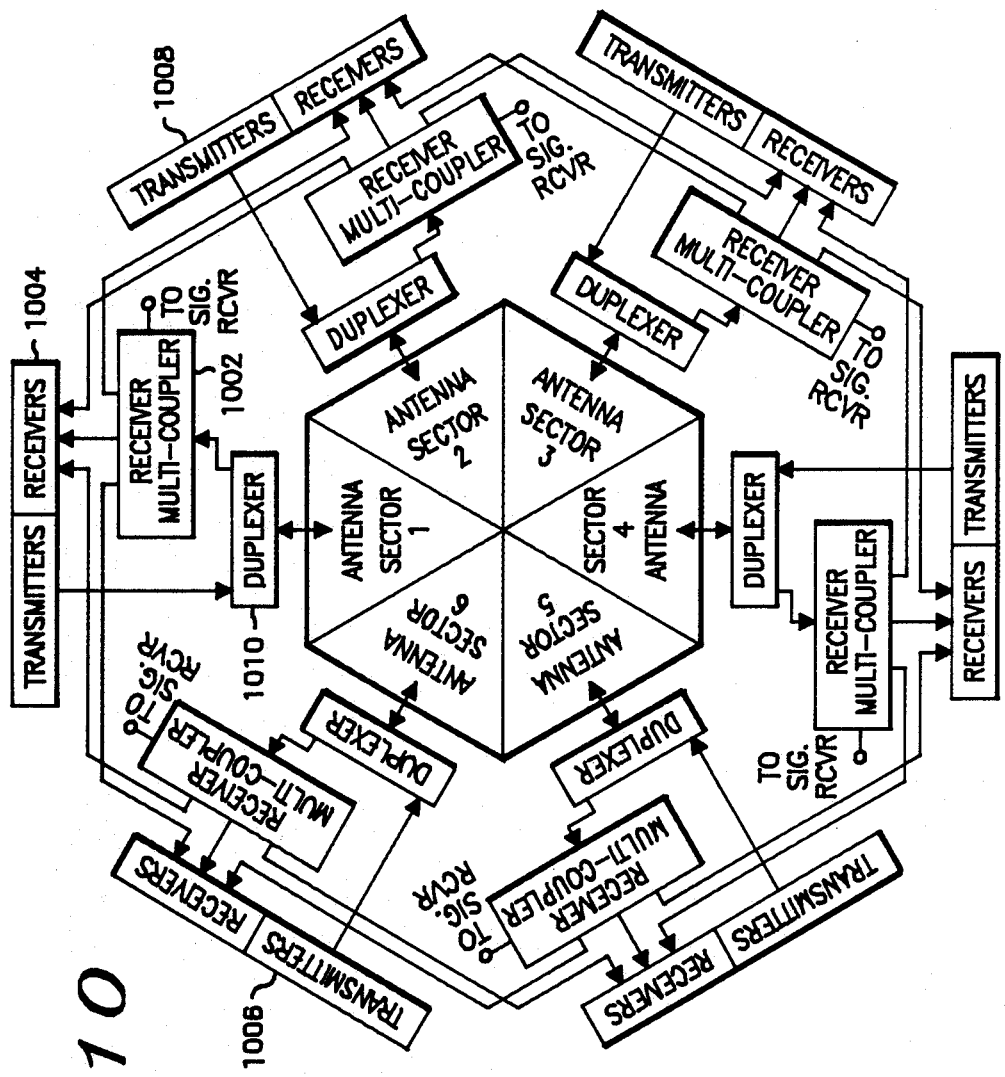
FIG. 10 is a block diagram of antenna interconnection in a center illuminated sector cell system which may advantageously utilize the present invention.

In order to reduce the amount of common equipment, provide for ease of expansion, and reduce the amount of intercabling and interconnection, the preferred embodiment of the novel invention of the present application may utilize the antenna system configuration shown in FIG. 10. The radio transceivers are connected to the sector antennas as shown. Especially note that each sector antenna is fed by a multicoupler (for example, RX multicoupler 1002) to the primary transceiver equipment dedicated to the particular sector (for example, transceivers 1004) and to both the adjacent sector transceiver equipment (for example, transceivers 1006 for sector 6 and transceivers 1008 for sectors 2). In addition, each sector antenna is coupled to a signalling receiver allowing the signalling receiver to have access to all six sector antennas. The transmitters of the primary transceiver equipment is coupled to the sector antenna via a duplexer (such as duplexer 1010). The duplexers may be similar to model ACD-2802-AAMO manufactured by Antenna Specialists Co., Cleveland, Ohio.

Figure 11:
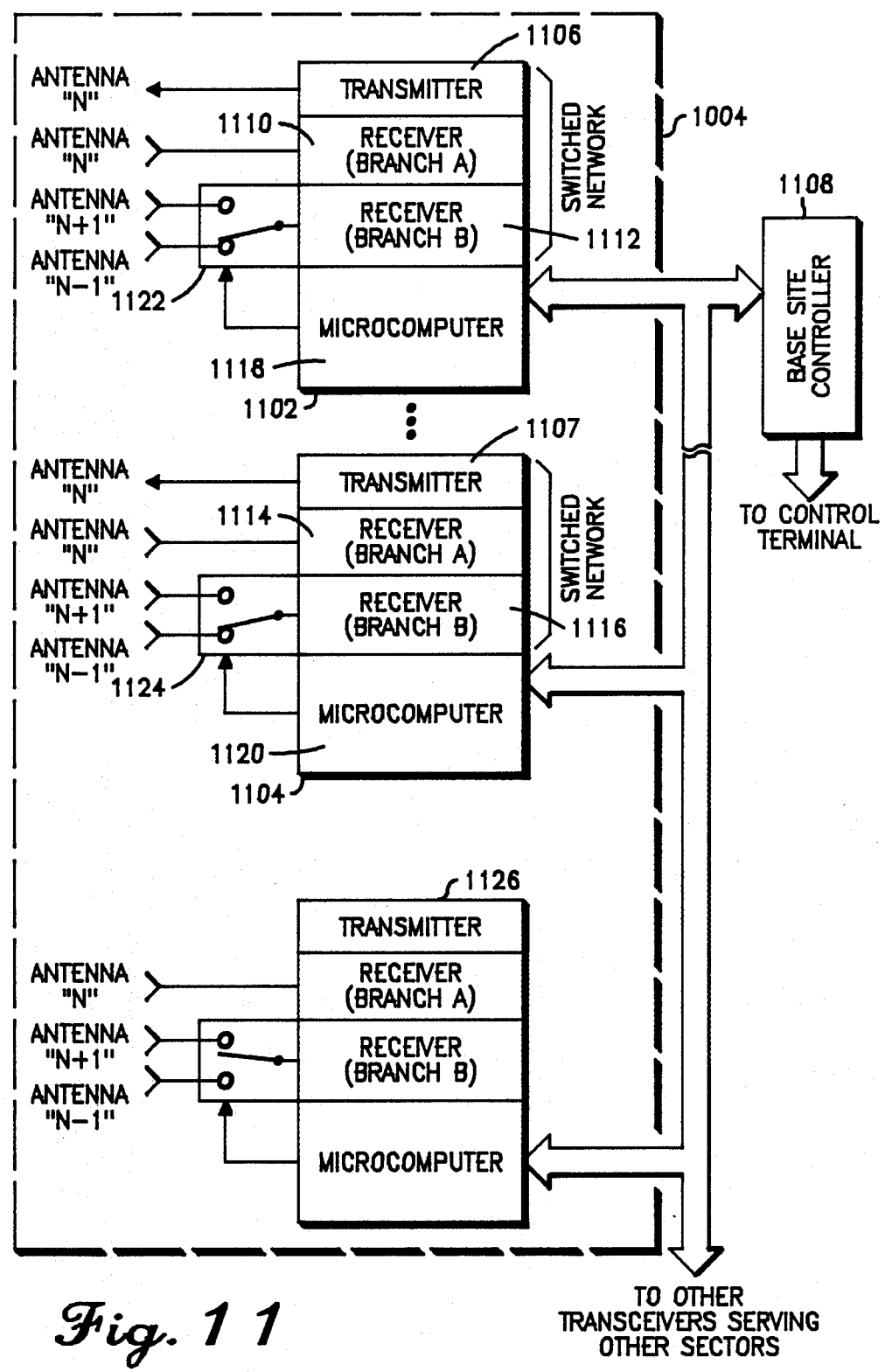
FIG. 11 is a block diagram of transceiver and base site controller interconnection in a cell system which may benefit from the present invention.

The interconnection of the fixed site transceivers to the antenna system and to the base site controller is shown in FIG. 11. In this configuration a transceiver (such as transceiver 1102 or transceiver 1104) consists of a transmitter 1106 and 1107 respectively, diversity receivers 1110 and 1112 (for transceiver 1102) and diversity receivers 1114 and 1116 for transceiver 1104. Each transceiver also comprises a microcomputer (1118 and 1120, respectively) and a sector switch (1122 and 1124, respectively). Additionally, an identical transceiver may be used as a scan receiver by employing the diversity receivers and the microcomputer as shown for transceiver 1126. (The transmitter for transceiver 1126 is not used).

Concentrating on the interconnections of transceiver 1102, it can be seen that transmitter 1106 and receiver (branch A) 1110 are coupled to the same primary antenna (via the duplexer 1010 and receiver multicoupler 1002 to antenna 1 as shown in FIG. 10). Receiver (branch B) 1112 is coupled to left and right adjacent sectors via sector switch 1122 (which from FIG. 10 are antenna 6 and antenna 2). The output bus from the BSC 1108 is connected to each of the microcomputers of the transceivers at a cell site. In the transceivers of the present invention, the transmitter 1106 input and receivers 1110 and 1112 output are connected to the switched network via the control terminal 420. Control of the interconnection to the control terminal 420 is achieved by microcomputer 1118 via control signals from the BSC 1108.

Figure 12:
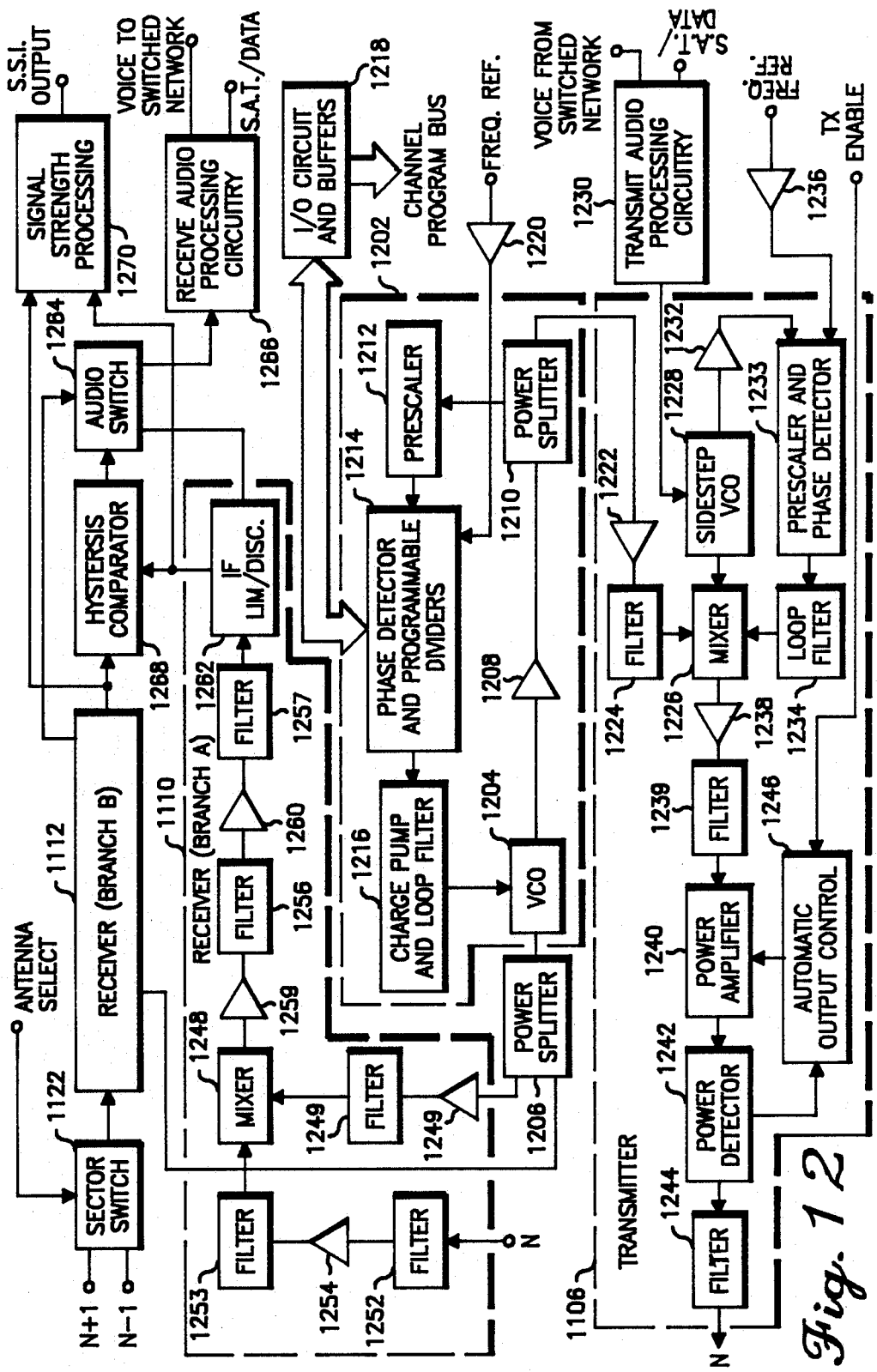
FIG. 12 is a detailed block diagram of the transceiver which may be employed in the system of the present invention.

A more detailed block diagram of the transceivers of the preferred embodiment is shown in FIG. 12. Transmitter 1106 and receivers 1110 and 1112 from transceiver 1102 are shown in detail. Each of the other transceivers including the scanning transceiver 1126 may have an identical design. In a preferred implementation of the present invention, a synthesizer 1202 having a conventional VCO 1204 provides the local oscillator signal for both receivers 1110 and 1112 via a power splitter 1206. The VCO 1204 also supplies a radio frequency signal to the transmitter 1106 via a buffer amplifier 1208 and power splitter 1210. A second output from power splitter 1210 is used as part of the conventional feedback of a frequency synthesizer and routed through pre-scaler 1212 to the phase detector and programmable dividers 1214 which, in turn, provides a correction signal to the charge pump and loop filter 1216 to place and hold the VCO 1214 at the proper frequency. Frequency selection is conventionally made by selecting the proper division ratio of the programmable dividers 1214 via the channel program bus and I/0 circuit and buffers 1218. The channel program bus is coupled to the transceiver microcomputer (such as microcomputer 1118) which selects the proper digital signal for the bus to place the transceiver on a designated channel. The ultimate stability of the synthesizer 1202 is determined by the frequency reference generated by an input to the phase detector and programmable dividers 1214 via buffer 1220. This reference is generated by a reference oscillator located in the common rack front end cabinet. The transmitter 1106 accepts the synthesizer 1202 frequency output signal at buffer amplifier 1222 and filters the radio frequency signal by filter 1224 before applying the radio frequency signal to mixer 1226. A second signal applied to mixer 1226 is generated by the sidestep VCO 1228 and conventionally angle modulated by voice signals from the switched network and data and supervisory audio tone (SAT) which are input to the sidestep VCO 1228 via transmit audio processing circuitry 1230 (which may be similar to model TRN9732A, Audio/Control Board described in Motorola Instruction Manual No. 68P81071E17, published by Motorola Service Publications, Schaumburg, IL. in 1985). The sidestep VCO 1228 is maintained at a frequency which is equal to or related to the spacing between the receiver and transmitter operating frequencies of the selected channel and the frequency chosen as the intermediate frequency of the receivers 1110 and 1112 by the conventional synthesizer control loop consisting of buffer amplifier 1232, prescaler and phase detector 1233, and loop filter 1234. Ultimate loop stability is controlled by the same frequency reference used for synthesizer 1202 via buffer amplifier 1236. (A similar method of sidestepping frequencies for duplex receivers and transmitters is further described in U.S. Pat. No. 3,825,830-O'Connor assigned to the assignee of the present invention). The output signal from mixer 1226, which in the present invention is equal to the output frequency of the transmitter on this selected channel is coupled via amplifier 1238 and filter 1239 to power amplifier 1240 where the transmitter signal is boosted in power to a useable transmission level. The output of the power amplifier 1240 is coupled through a power detector 1242 and a filter 1244 before being coupled to a duplexer (such as duplexer 1010) or to an external power amplifier which may further increase the transmitter signal power. The output from power detector 1242 is coupled to a conventional automatic output control circuit 1246 which fixes the level of the output of power amplifier 1240 at a constant level.

The receiver local oscillator signal is coupled from the power splitter 1206 to the mixer 1248 of receiver (branch A) 1110 via buffer amplifier 1249 and filter 1250. (Identical circuit configuration exists for receiver (branch B) 1112 and an identical description for receiver (branch B) 1112 is omitted here for brevity). A received signal from the primary antenna is input to the mixer 1248 via filters 1252 and 1253 and radio frequency preamp 1254. The intermediate frequency (IF) product of the two signals input to mixer 1248 is selected by filters 1256 and 1257 and amplified by IF amplifiers 1259 and 1260 before being applied to an IF limiter/discriminator circuit 1262. Two outputs are provided from the IF limiter/discriminator 1262, the first of which is the demodulated audio signal which is passed through audio switch 1264 and receive audio processing circuitry 1266 (which may also be similar to a model TRN9732A Audio/Control Board) where the voice signal is coupled to the switched network, the data is coupled to the BSC, and the supervisory audio tone (SAT) is detected by comparison to a locally generated tone and the detection is supplied to a microprocessor of the transceiver microcomputer 1118. A second output from the IF limiter discriminator 1262 is a signal which corresponds to the signal strength of the received signal from the antenna and is known as the receive signal strength indicator (RSSI). The RSSI signal is coupled to a hysteresis comparator 1268 (an MC3302 or equivalent in the preferred embodiment) which compares the RSSI signal from receiver (branch A) 1110 and receiver (branch B) 1112. The result of the comparison causes the audio switch 1264 to pick the demodulated audio signal from either receiver 1110 or receiver 1112 depending upon which RSSI signal indicates a stronger received signal and allows that demodulated audio to be coupled to the received audio processing circuitry 1266. In one implementation of the preferred embodiment, further processing of the RSSI signal is accomplished in a signal strength processing circuit 1270 and output to the transceiver microcomputer 1118 for use by the BSC 1108 and control terminal 420. Such a receiver having the signal strength processing circuit 1270 may be used as a scanning receiver 1126.

Figure 13:
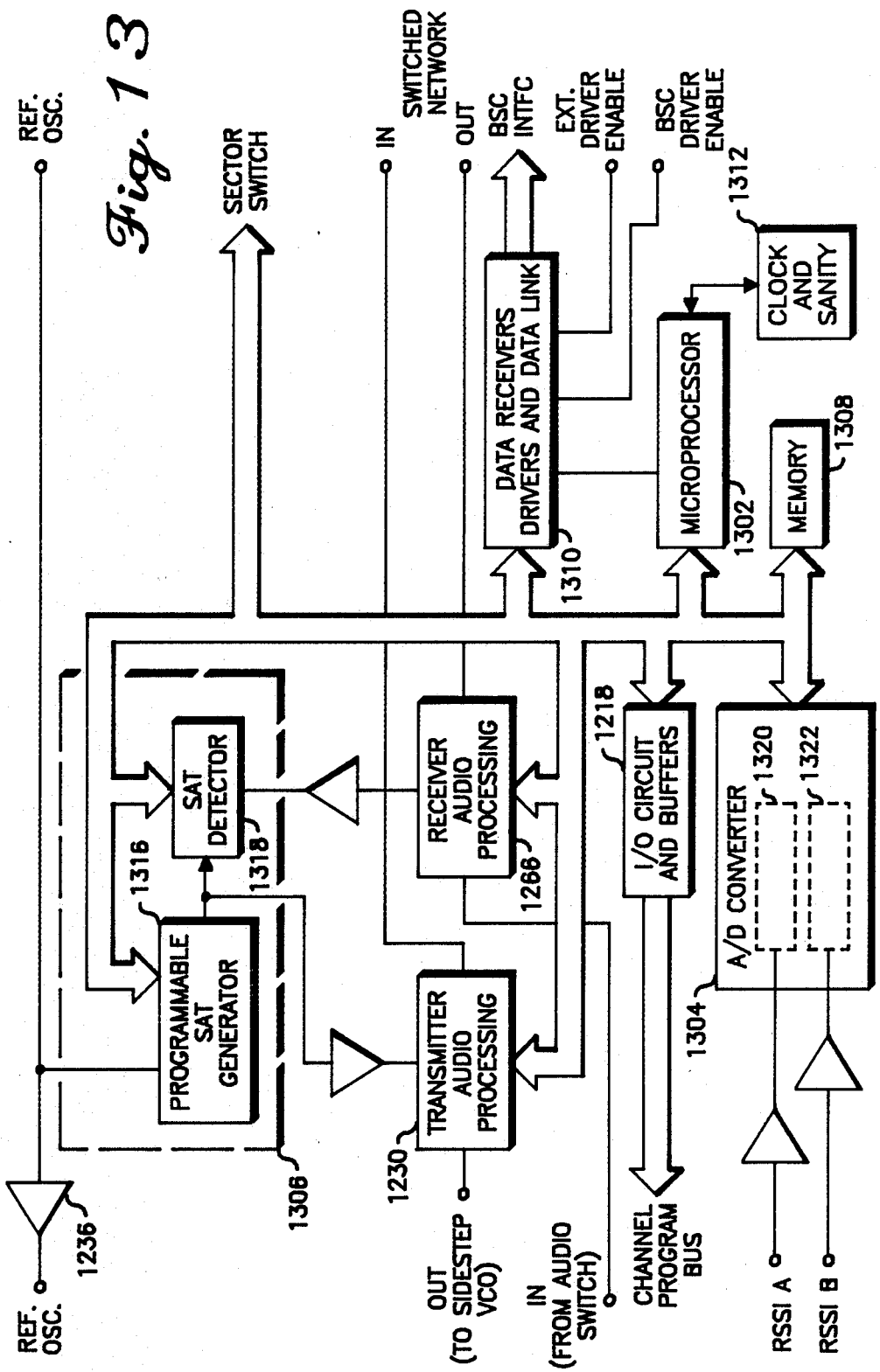
FIG. 13 is a block diagram of the microcomputer which may be employed in the transceiver of FIG. 12.

Referring to FIG. 13, It will be seen that the microcomputer 1118 and 1120 of the transceivers may consist of a microprocessor 1302 (which may be an MC1468705G2 microprocessor available from Motorola, Inc. or equivalent) which is used to control the other submodules of the transceiver. The microcomputer 1118 has as major peripherals an A/D converter 1304, a supervisory audio tone (SAT) generator 1306, conventional RAM and ROM memory 1308, conventional data receivers, drivers and data mux (for selecting sources and destinations of land/radio data) 1310, and microprocessor clock and sanity timing device 1312. Control data and information is coupled between the microprocessor 1302 and the base site controller (BSC) via the data receivers/drivers 1310 which may have additional enable ports for external control. The analog to digital (A/D) converter 1304 for the received signal strength may be realized by a multiplexing A/D converter such as an MC145041 available from Motorola, Inc. or equivalent. Conceptually, a dual channel A/D converter 1304 can be considered individual A/D channel 1320 for receiver (branch A) and A/D channel 1322 for receiver (branch B). The digitized received signal strength is made available to microprocessor 1302 as needed.

The supervisory audio tone (SAT) detector 1306 is realized in the preferred embodiment by generating a selected SAT frequency in a programmable SAT generator 1316 (which may conventionally be realized using a phase locked loop such as an MC14046 available from Motorola Inc. and standard programmable BCD/binary counters such as MC14569 available from Motorola, Inc.). The SAT output may then be coupled to a SAT detector circuit 1318 which may be a conventional frequency comparison network. The detection may then be coupled to the microprocessor 1302.

Because the transceiver of the preferred embodiment is equipped with a programmable frequency synthesizer 1202 for both receiver and transmitter (programmed by microprocessor 1302 via I/O circuit and buffers 1218), an A/D converter 1304, and a SAT generator 1306, the transceiver may be used interchangeably as a scan receiver, as a voice channel transceiver, or a signalling channel receiver. This fact allows the BSC 1108 to be relieved of the task of making and controlling the process of signal strength measurement and SAT detection thereby making possible the use of available voice channel transceivers as scanning receivers when a handoff measurement request is received from the control terminal 420. The transceiver takes cell site characteristics that are downloaded from the voice channel controller of BSC 1108 via the transceiver interface communications link. The downloaded information is the cell type in which the transceiver is being operated (Omni, Sector) and what kind of function the transceiver is to perform in the system: voice channel transceiver, scanning receiver, or signalling transceiver. Also, the transceiver used for scanning is capable of queueing several handoff measurement requests, executing them, and queueing the results.

Handoff measurement requests that come to a transceiver via the VCC are queued automatically and are run as soon as possible. The only reason that a handoff measurement request would not run immediately is that it would have to wait for a current request to finish execution. Included within the handoff measurement request are the channel frequency synthesizer 1202 programming and the SAT generator 1316 programming.

When a handoff measurement request comes to a selected transceiver, a flag is set that alerts the SSI measurement software to the fact that there is a measurement request that is waiting execution in the queue. When the measurement request software task runs, it pulls the request out of the queue, programs the SAT generator 1316, programs the frequency synthesizer 1202, and then begins taking measurements.

Results of the handoff measurement requests are queued in the RAM memory 1308 of the transceiver microcomputer and await an opportunity to be sent uplink to the VCC. That opportunity comes when the VCC polls the transceiver for its status. Since handoff measurement responses have priority over all other outbound messages from the transceiver, the response will go uplink as soon as possible.

Figure 14:
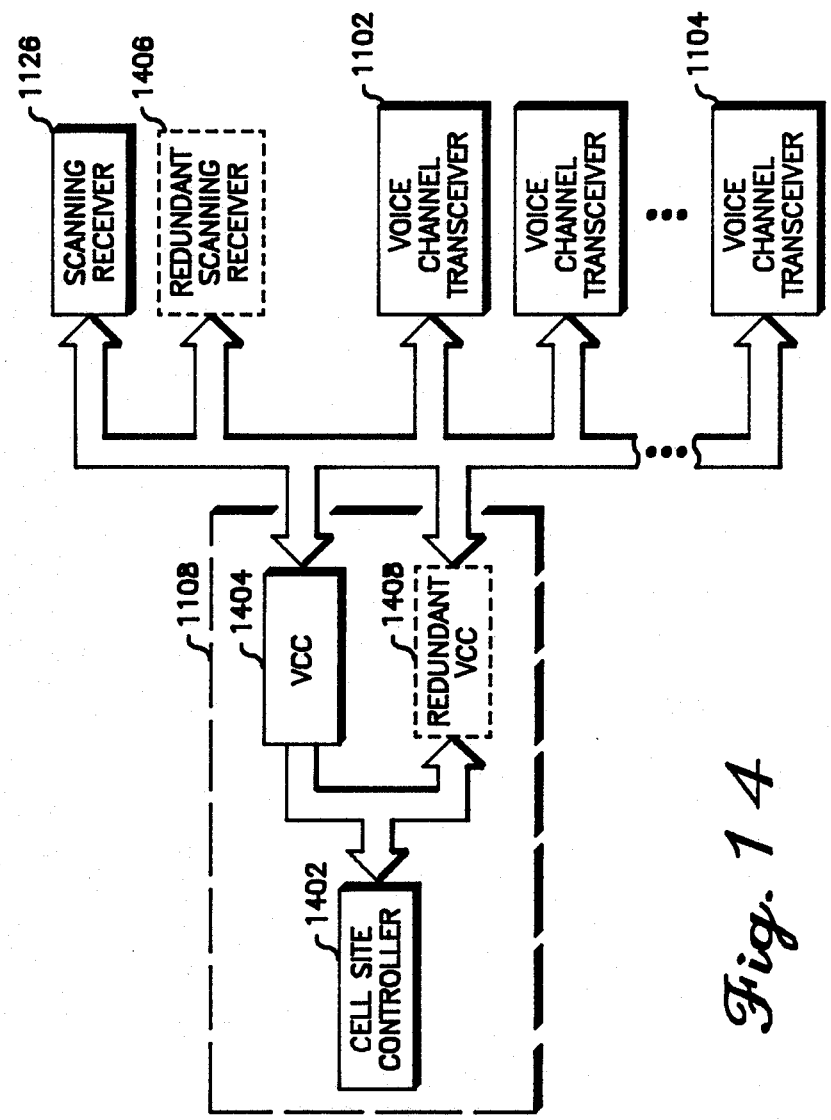
FIG. 14 is a block diagram of the base site controller of the present invention illustrating redundancy.

FIG. 14 illustrates the basic block diagram of the BSC 1108 and its interconnection to the transceivers. The cell site controller (CSC) 1402 is the highest level function and coordinates all of the activities at the cell site as well as providing the interface between the cell site and the telephone central office 422 (mediated by the control terminal 420).

Figure 15:
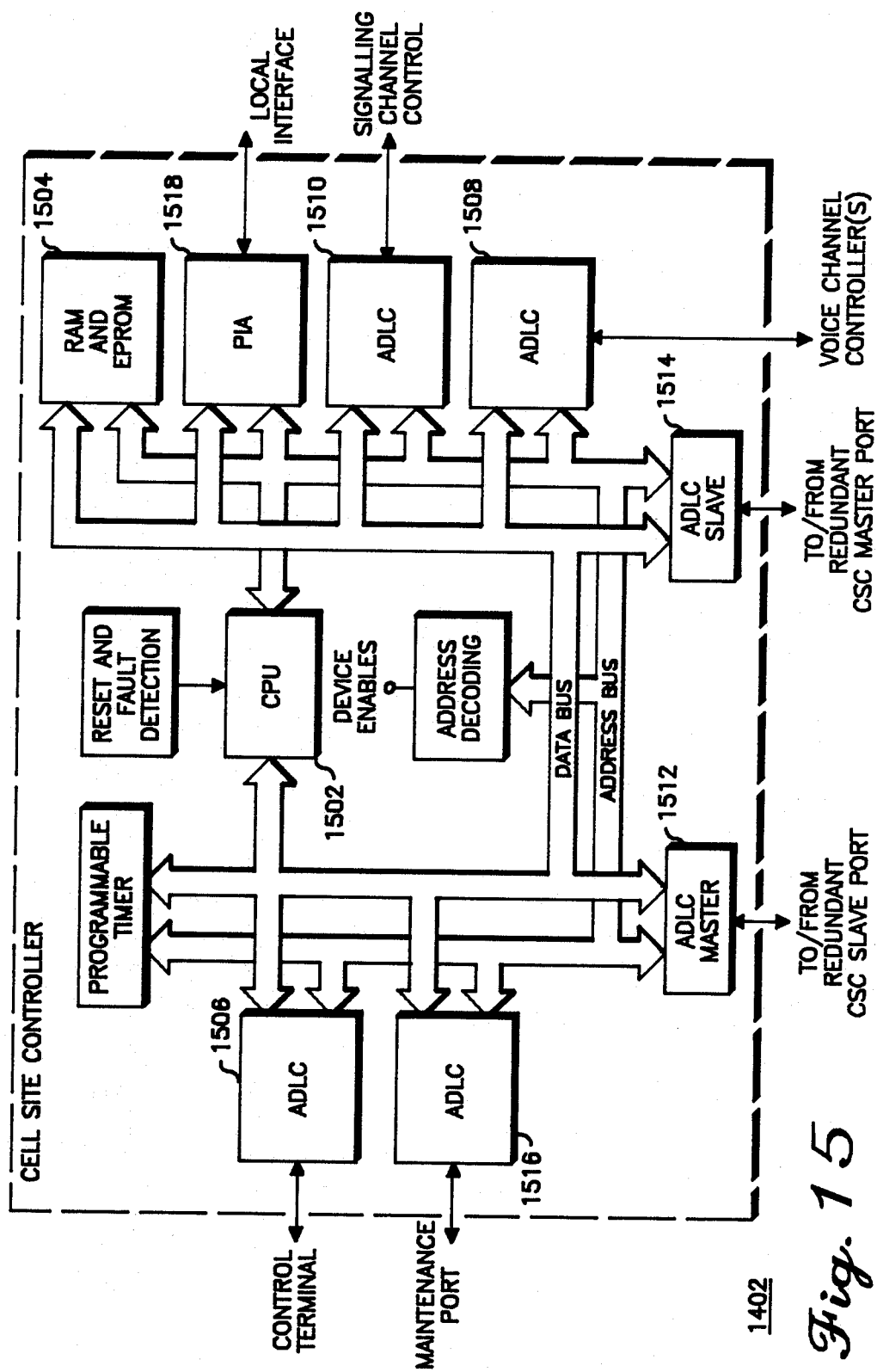
FIG. 15 is a detailed block diagram of a cell site controller (CSC) such as that which may be employed in the base site controller of FIG. 14.

A more detailed block diagram of the cell site controller (CSC) is shown in FIG. 15. A microprocessor such as an MC6802 available from Motorola, Inc., is employed as a central processing unit (CPU) 1502 which coordinates all of the activities at the cell site in accordance with an operating program stored in RAM and EPROM 1504. Six data ports are used to exchange control and status messages with the control terminal 420 (via ADLC 1506), one or more voice channel controllers (VCC's) (via ADLC 1508), signalling channel receiver control (via ADLC 1510), redundant (slave) CSC and/or redundant (master) CSC (via ADLC 1512 and 1514 respectively), and a maintenance port (via ACIA 1516). All of the aforementioned serial ports in the preferred embodiment, except for the maintenance port, are bit-oriented synchronous serial data links using a version of the Advanced Data Communications Control Procedures (ADCCP) as the communications protocol. The maintenance port, used for maintenance and software loading, supports a standard asynchronous serial protocol. Additionally, a peripheral interface adapter (PIA 1518) supports auxiliary input/output which may be used as a local customer interface.

A voice channel controller (VCC) 1404 may control up to 30 voice transceivers and one scanning receiver in the preferred embodiment. A redundant VCC 1408 may be employed to provide system redundancy down to the voice channel transceiver and double the transceiver capacity. This is possible because each transceiver has two communications ports with which to communicate with two VCCs. The communications ports on the transceivers are embodied within the transceiver microcomputer itself. A signal called "XCVREN" (transceiver enable) is used by the VCC to select the port on the transceiver that will be used for communications. One VCC will control one port and a redundant "partner" VCC will control the other port. The transceiver communicates with that VCC which is currently asserting the XCVREN signal. Thus it is possible for the second VCC to continue controlling a voice transceiver should the first VCC fail. It is even possible to reconstruct call activity as the call processing and maintenance state of the voice transceiver is continuously being updated.

If the maintenance state of the channel is "in service", the call processing state can be taken from the transceiver and reconstruct the call. The call processing and maintenance states of a particular channel are stored within the transceiver by sending these states periodically in certain messages that are used to control the transceiver by the controlling VCC. When another VCC (the partner) takes control of the channel, it queries the transceiver as to its call and maintenance states. The maintenance state is used to update a list and the call state is used to reconstruct the SAT detection algorithm in the VCC. From the call state it can be determined whether to be looking for positive or negative SAT detection on the channel. This corresponds to the channel being in a conversation state, a connect state, or a disconnect state.

Figure 16:
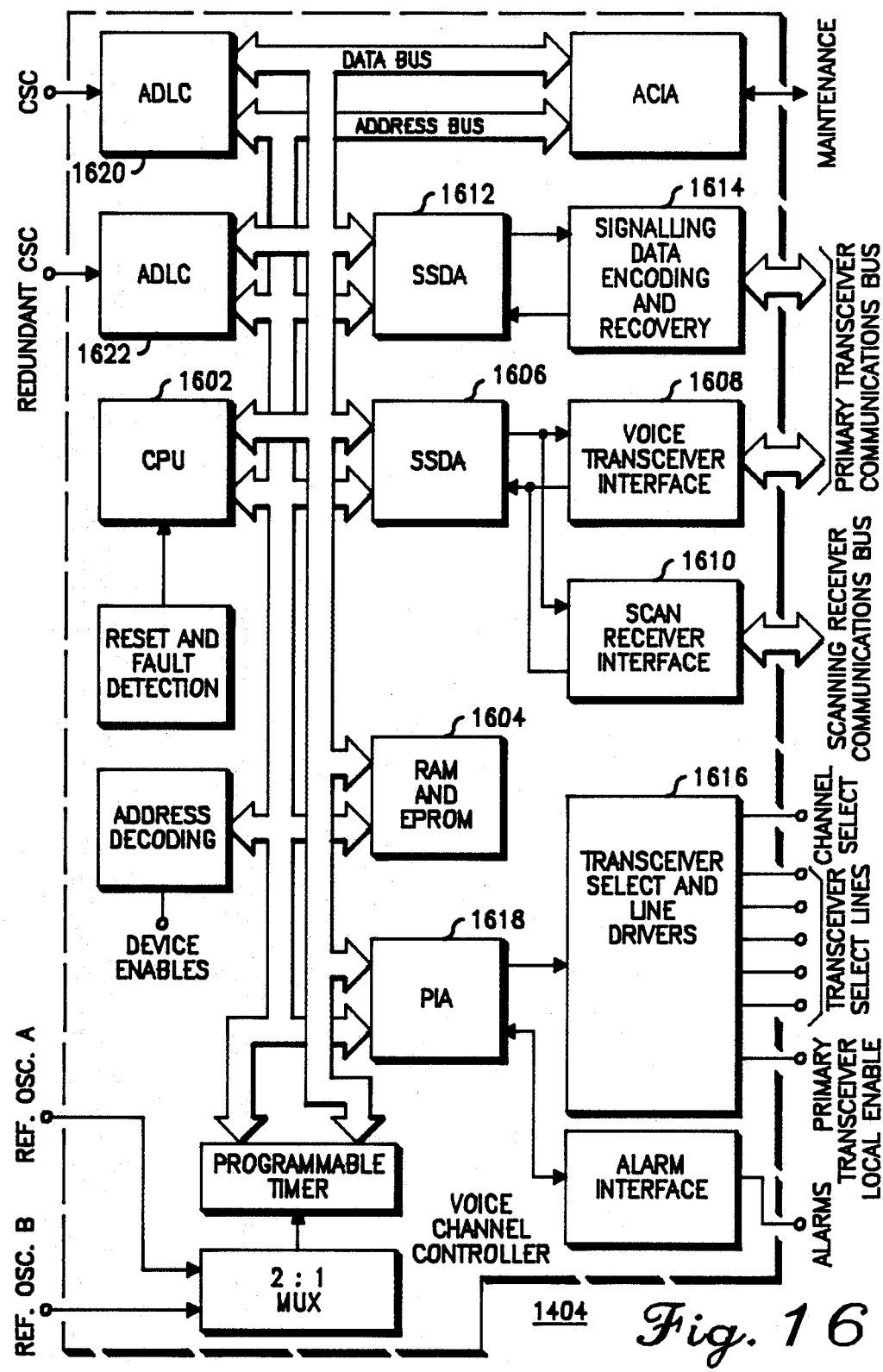
FIG. 16 is a detailed block diagram of a voice channel controller (VCC) such as that which may be employed in the base site controller of FIG. 14.

A detailed block diagram of a voice channel controller (such as VCC 1404) which may be employed in the present invention is shown in FIG. 16. The central processing unit (CPU 1602) may be a microprocessor such as an MC6809 available from Motorola, Inc. This CPU 1602 is used to control the cell site voice channel transceivers and scanning receiver(s) in accordance with programmed steps stored in RAM and EPROM 1604. In a nonredundant configuration of the present invention, VCC 1404 may control up to 30 channels of radio equipment and one scanning receiver employing SSDA 1606, voice channel transceiver interface 1608, and scanning receiver interface 1610. Signalling data encoding and decoding is controlled via SSDA 1612 and signalling encoding and recovery interface 1614. Transceivers are selected by select logic and line driver circuit 1616 which is controlled by CPU 1602 via peripheral interface adaptors (PIA 1618). In the redundant configuration requiring two VCC's, each transceiver (being dual-ported) can communicate with both VCCs. Under normal operating conditions, each VCC actively controls half of the channels while exchanging control and status messages with the other half. Interface with the master CSC (if present) via ADLC 1622.

Native to the base site controller (BSC) and transceivers of the present invention is the concept of per channel scan. This concept relates to individual voice channel transceivers having the capability of tuning to any one of a predetermined set of channels and measuring the strength of any received signal on that channel. Thus, a request for a handoff from the control terminal 420 can be serviced by allowing an unused voice channel transceiver to make the requisite signal strength and supervisory tone measurements and requires voice transceivers equipped with supervisory audio tone (SAT) detection circuitry, an analog to digital converter, and a reprogrammable frequency synthesizer such as that previously described. Such a transceiver is capable, not only of providing a communications channel for message conversation in a cellular system, but also of detecting the correct supervisory audio tone (SAT) and measuring the received signal strength on any selected channel in its primary sector and the left and right adjacent sectors. The transceiver of the present invention, therefore, allows the elimination of the dedicated scanning receiver by replacing it with a plurality of function-variable voice channel transceivers which may be either voice channel receivers or scanning receivers as needed.

Within every device that is the highest level device in the base site controller (BSC) system present at a cell site (a cell site controller (CSC) or one or more voice channel controllers (VCC's)) there is kept a record showing the status of the transceivers being controlled by the device. This record which is held in the data RAM portion of the highest level controller in the BSC suite such as RAM 1504, found in CSC 1402 contains a description of transceiver equippage (in some applications of the preferred embodiment some transceivers may not be equipped with the SAT detector and A/D converter), operating status, and link lists for the equipped voice channels.

Figure 17:
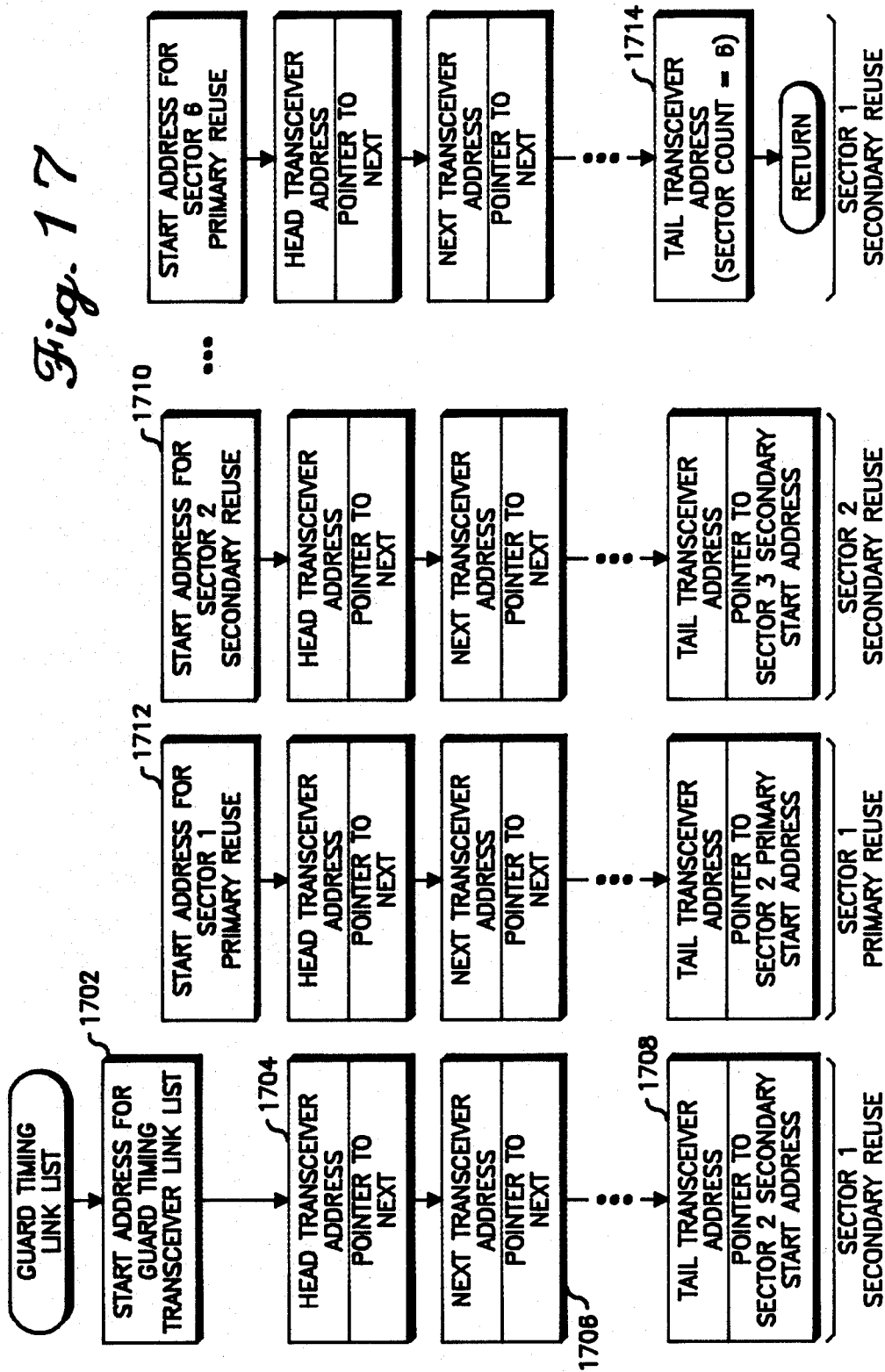
FIG. 17 is a flowchart of a guard timing link list employed in the present invention.

The link lists are arranged by sector and reuse group as shown for the guard timing link list of FIG. 17. One link list is maintained for transceivers which are assigned to a particular voice channel but which are not currently being used in a conversation state—an "idle" transceiver. A second link list is maintained for transceivers which are in a disconnect state for five seconds—a "guard timing" transceiver. The disconnect state for a channel is that state that the channel is in when a mobile or land disconnect has been executed by the BSC and the BSC is waiting for the remote unit to clear the channel. Guard timing (5 seconds before the channel is returned to the idle channel link list) is performed to make sure that the remote unit end of the call is properly terminated. If the remote unit did not disconnect itself or properly receive the disconnect message from the BSC it will surely drop after 5 seconds of continuous loss of supervisory audio tone (SAT). Each link list is further subdivided by radio channel reuse group into primary and secondary reuse groups. Reuse group determines which channels are selected most often for telephone calls. All channels in the primary reuse group will be exhausted from the idle channel link list before secondary reuse group channels are selected to handle calls. Reuse groups for channelization may be set up to minimize co-channel radio interference as much as =possible such as described in U.S. Pat. No. 4,128,740 -Graziano, assigned to the assignee of the present invention. This categorization of transceivers may be employed in the present invention to provide a priority selection of transceivers for use in fulfilling a scanning request.

Figure 18A:
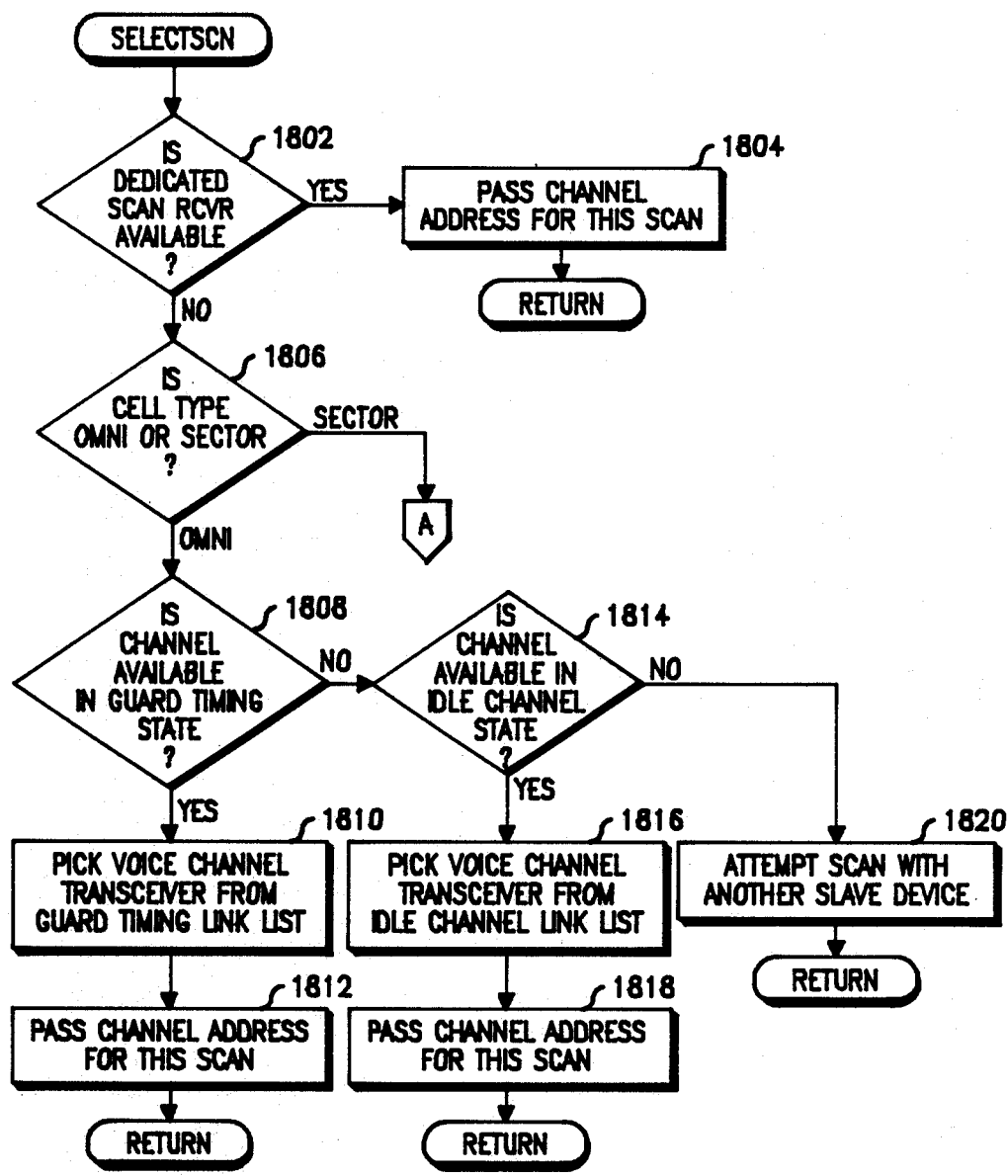
FIGS. 18a and 18b are flowcharts of the scanning process which may be employed in the microcomputer of FIG. 13.
Figure 18B:
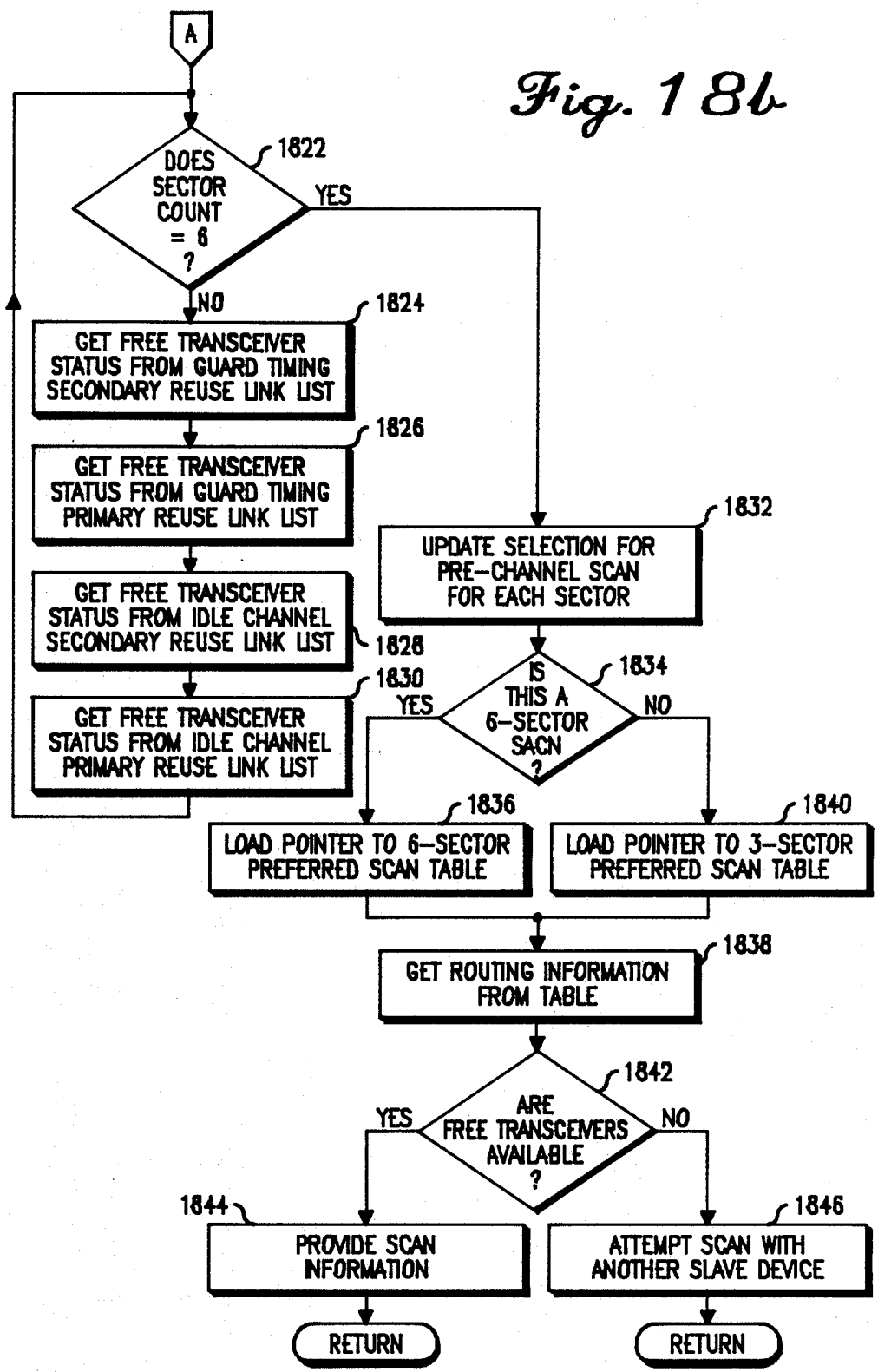

When a handoff measurement request is received by the BSC 1108 from the control terminal 420, the scan selection process of FIGS. 18a and 18b is employed to optimize the selection of voice channel transceivers for a scan event. A determination (1802) is first made whether a dedicated scanning receiver is available in the cell. If such a receiver is available, the channel frequency on which a signal strength and supervisory audio tone (SAT) measurement is to be made is communicated to the dedicated scanning receiver (at 1804). The availability of a scanning receiver may be determined by the number of requests for scanning events or by the fact that the system design for this particular cell has dictated that a scanning receiver not be dedicated to this purpose.

If a scanning receiver is not available, a determination is made at 1806 whether this cell is a sectorized cell or an omnidirectional cell. Assuming, first, that the cell is an omnidirectional cell, availability of a voice channel transceiver in the guard timing state is determined at 1808. If a transceiver is available, the "head" transceiver from a guard timing link list (secondary reuse first) is chosen at 1810 and given the channel frequency address for completion of SAT and signal strength measurement at 1812. The guard timing link list will be discussed later in conjunction with FIG. 17.

If a voice channel transceiver is not available in the guard timing state, availability of a voice channel transceiver in idle channel state is determined at 1814. If a voice channel transceiver is available in an idle state, the "head" transceiver from the idle channel link list is chosen at 1816 in a manner similar to that for the guard timing link list. The idle channel link list "head" transceiver is then supplied the channel frequency address for completion of the SAT and signal strength measurement at 1818.

If a voice channel transceiver is not available in the idle channel state, another slave device (such as another VCC) is attempted, if available, (at 1820) via another pass through the "selectscn" process of that slave device. If no voice channel transceviers are found available, no scan signal strength measurement can be made in the selected cell. This finding is not detrimental to the handoff process because if a voice channel transceiver cannot be found for a handoff scan event, a voice channel transceiver cannot be found to be used to carry voice channel traffic after a handoff.

Assuming the determination of omnidirectional cell versus sectorized cell at 1806 indicates a sectorized cell, a sector counting loop is initiated at 1822. In the preferred embodiment, the "free" voice channel transceiver status is obtained (at 1824) first from the guard timing secondary reuse link list (shown in FIG. 17). (A transceiver from this list is least likely to be called upon to be used as a voice channel. In the unlikely event that a selected transceiver is needed for voice channel purposes during a scan event, the measurement is aborted). Next, the free voice channel transceiver status from the guard channel primary reuse link list is obtained at 1826. Similarly, the free voice channel transceiver status from the idle channel secondary reuse link list is obtained at 1828 and the free voice channel transceiver status from the idle channel primary reuse link list is obtained at 1830. The process thus yields a prioritized list of available voice channel transceivers by sector.

If all six sectors have been checked for available voice channel transceivers, the process moves from step 1822 to an update of the per-channel scan selection for each sector (at 1832). This step may be employed to remove any transceiver from the available list if the transceiver had been used for a recent scan event. A determination of whether all six sectors need to be scanned or whether three sectors are sufficient (at 1834). (This tested information is sent to the CSC by the control terminal 420 at the initiation of the handoff event). If a six sector scan is desired, a pointer to the six sector preferred scan table (Table 1) is loaded (at 1836) and the proper routing information is read from Table 1 corresponding to the availability of transceivers (at 1838). If a three sector scan is desired, a similar process is followed at 1840 and an abbreviated preferred scan table (not shown) is employed. If free voice channel transceivers are available (checked at 1842), the appropriate transceivers from the preferred scan table are loaded with the scan information (at 1844) and the process proceeds to complete the SAT and signal strength measurement. If no free voice channels are found, another slave device (VCC) is tried, if available, (at 1846) with the "selectscn" process.

After an idle or guard timing transceiver has been selected as a scanning element for the current scan event, the CSC sends a message to the slave device (VCC) that is the "owner" of the channel. The owner of the channel will queue the request internally. The request is formatted into a message sent to the transceiver containing the frequency to be measured for signal strength and the SAT to be matched after the strength of the signal has been determined. The transceiver receives the message from the VCC and queues the message if a scan is currently in progress. If no scan is in progress, the SAT generator on the transceiver is programmed with the SAT assignment in the message and the frequency synthesizer is programmed to the correct channel. The results of the measurements and the comparison of the SAT that should be on the channel are formatted and sent to the VCC. The VCC then matches the scan event with the results and formats a message to be sent uplink to the CSC and central controller. In cellular systems, the supervisory audio tone is measured to insure that the signal strength measurement is being performed on the right remote unit. Note that it is not enough just to measure the radio energy on a particular channel without knowing if the correct remote unit is there.

The six sector preferred scan table for the preferred embodiment is reproduced below. The availability of transceivers from the channel section of the link lists of FIG. 17 are expressed by the VCC as a six bit word uplink to the CSC. This available transceiver word is shown in the left hand column of the Table, arranged, by sectors. This word maps into a predetermined selection of transceivers in the "selected transceivers" right hand column of Table 1. The minimum number of transceivers is thereby chosen for the scan of the entire six sector cell. Ideally, only two opposing transceivers need to be selected since each sector transceiver has the capability of measuring the primary sector and the left and right adjacent sector (as described previously). Thus, if a transceiver is available in all sectors (see last entry in the left hand column of Table 1), the predetermined selected transeivers are those in sectors 2 and 5 (see last entry in the right hand column of Table 1). Other mappings are shown for other availabilities. The use of the minimum number of transceivers minimizes the required scan time while reducing the data passed between the controlling devices. Additionally, the use of a predetermined mapping table reduces the amount of calculation necessary by the controlling device.

Referring again to FIG. 17, it can be seen that entry into the guard timing link list process gives (at 1702) the starting address for the "head" transceiver of the secondary reuse list of sector 1 (at 1704). Each transceiver address in the list provides a pointer to the next transceiver address in the list (such as transceiver address 1706). The pointer chains one transceiver address to another until the "tail" transceiver address (at 1708) in the sector reuse list is found. (Transceivers just entering the guard timing list enter at the tail and are pushed up toward the head by later entering transceivers. When the guard timing period is over, the transceiver address is transferred to the idle channel link list-not shown but equivalent to the guard timing link list. These link lists may also be used by a selection process for voice channel utilization).

The tail transceiver pointer may indicate a start address location at 1710 for the sector 2 secondary reuse list thereby enabling the secondary use lists to be checked first. At the conclusion of the secondary use lists, a pointer may indicate the start address of the primary reuse list of sector 1 (at 1712). When the tail transceiver address of the primary reuse list of sector six (at 1714) is reached, the sector count equals six and the six bit word indicating the voice channel transceiver availability for the guard timing link list is compiled. A similar process is followed in the idle channel link list. Other processes employing a similar set of link lists may be employed without deviating from the scope of the present invention.

In summary, then, The method and apparatus for utilizing voice channel transceivers as temporary scanning receivers for signal strength measurement during a handoff event has been disclosed in the foregoing description. The base site controller at each cell site maintains a link listing of the identification of those voice channel transceivers which are in guard timing mode and of those transceivers which are in idle mode. Each listing is further prioritized by a predetermined organization into primary reuse and secondary reuse status lists reflecting the minimum interference radio frequency plan of the cell system. If the cell is a sectorized cell, primary and secondary reuse lists are maintained for each sector in both the guard timing and idle link lists. When a signal strength measurement request is received by the base site controller, the first transceiver identification in each list starting with sector 1 of the secondary reuse list of the guard timing link list is obtained in a scan of each list. The sectors of the cell having an available voice channel transceiver are identified in a six bit word which is employed as an address in a look up table to identify the minimum number of transceivers necessary to measure signal strength throughout the cell. When the signal strength measurement is complete, the identification of the transceivers employed is returned to the proper list in a manner which results in a first in, first out utilization of voice channel transceivers for scanning purposes. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

TABLE 1

SIX SECTOR PREFERRED SCAN TABLE

| Available Transceivers Sector 654321 | Selected Transceivers 654321 |
|---|---|
| 000000 | 000000 |
| 000001 | 000001 |
| 000010 | 000010 |
| 000011 | 000010 |
| 000100 | 000100 |
| 000101 | 000101 |
| 000110 | 000100 |
| 000111 | 000010 |
| 001000 | 001000 |
| 001001 | 001001 |
| 001010 | 001010 |
| 001011 | 001001 |
| 001100 | 001000 |
| 001101 | 000101 |
| 001110 | 000100 |
| 001111 | 001010 |
| 010000 | 010000 |
| 010001 | 010001 |
| 010010 | 010010 |
| 010011 | 010010 |
| 010100 | 010100 |
| 010101 | 010101 |
| 010110 | 010010 |
| 010111 | 010010 |
| 011000 | 010000 |
| 011001 | 010001 |
| 011010 | 001010 |
| 011011 | 001001 |
| 011100 | 001000 |
| 011101 | 001001 |
| 011110 | 001010 |
| 011111 | 001001 |
| 100000 | 100000 |
| 100001 | 000001 |
| 100010 | 100010 |
| 100011 | 000001 |
| 100100 | 100100 |
| 100101 | 100100 |
| 100110 | 100100 |
| 100111 | 100100 |
| 101000 | 101000 |
| 101001 | 001001 |
| 101010 | 101010 |
| 101011 | 001001 |
| 101100 | 101000 |
| 101101 | 101000 |
| 101110 | 100100 |
| 101111 | 001010 |
| 110000 | 100000 |
| 110001 | 100000 |
| 110010 | 010010 |
| 110011 | 010010 |
| 110100 | 100100 |
| 110101 | 100100 |
| 110110 | 010010 |
| 110111 | 100010 |
| 111000 | 010000 |
| 111001 | 010001 |
| 111010 | 010010 |
| 111011 | 010010 |
| 111100 | 100100 |
| 111101 | 101000 |
| 111110 | 010100 |
| 111111 | 010010 |

We claim:

1. A method of scanning receiver allocation in a cellular radiotelephone system consisting of a plurality of remote telephone units at least one of which is engaged in two way commuications with another telephone unit via fixed equipment covering geographically distinct areas by radio, the engaged remote telephone unit requiring a handoff from serving fixed equipment in one area to fixed equipment in another area, comprising the steps of:

obtaining a voice channel transceiver identification from at least one link list;

determining which voice channel transceiver of the fixed equipment may be available for use as a temporary scanning receiver in an area not serving the engaged remote telephone unit;

selecting at least one said available voice channel transceiver; and instructing said selecting voice channel transceiver to tune to a radio frequency currently in use by the engaged remote telephone unit and to measure the received signal strength of the engaged remote unit on said radio frequency.

2. A method in accordance with the method of claim 1 further comprising the step of recalling said voice channel transceiver identification from one of at least two reuse lists within said at least one link list.

3. A method in accordance with the method of claim 2 further comprising the step of returning said voice channel transceiver identification to said one of at least two reuse lists of said at least one link list in accordance with a predetermined radio frequency reuse pattern and an association of said voice channel transceiver with a primary antenna.

4. A method in accordance with the method of claim 2 further comprising the step of selecting said voice channel transceiver identification from a preferred one of said at least two reuse lists.

5. A method in accordance with the method of claim 4 wherein said step of selecting said voice channel transceiver identification further comprises the step of selecting on a first-in, first-out basis.

6. A method in accordance with the method of claim 1 further comprising the step of returning said voice channel transceiver identification to said at least one link list.

7. A method in accordance with the method of claim 6 wherein said step of returning a voice channel transceiver identification to said in at least one link list further comprises the step of selecting a guard timing link list for said transceiver identification storage if said voice channel transceiver is in a guard timing mode and selecting an idle channel link list for said transceiver identification storage if said voice channel transceiver is in an idle channel mode.

8. A method in accordance with the method of claim 1 wherein said step of selecting at least one available voice channel transceiver further comprises the step of obtaining a representation of available voice channel transceivers in areas not serving the engaged remote unit.

9. A method in accordance with the method of claim 8 further comprising the step of mapping said obtained representation into one of a plurality of predeterminedly selected geographic area patterns of available voice channel transceivers.

10. A method in accordance with the method of claim 1 further comprising the step of aborting said step of instructing said at least one selected voice channel transceiver to tune to a radio frequency if said selected voice channel transceiver were simultaneously selected to serve a second remote telephone unit as a voice channel transceiver.

11. A base site controller for a cellular radiotelephone system which consists of a plurality of remote telephone units at least one of which may be engaged in two way communications with another telephone unit via fixed equipment, including at least one base site controller and a plurality of voice channel transceivers, covering geographically distinct areas by radio, the engaged remote telephone unit requiring a handoff from serving fixed equipment in one area to fixed equipment in another area, the base site controller comprising:

means for obtaining a voice channel transceiver identification from at least one link list;

means for determining which voice channel transceivers may be available for use as a temporary scanning receiver in at least one area not serving the engaged remote telephone unit;

means for selecting at least one said available voice channel transceiver; and means for instructing said at least one selected voice channel transceiver to tune to a radio frequency currently in use by the engaged remote telephone unit and to measure the received signal strength of the engaged remote unit on said radio frequency.

12. A base site controller in accordance with claim 11 wherein said means for recalling further comprises second means for recalling said voice channel transceiver identification from one of at least two reuse lists in within said at least one link list.

13. A base site controller in accordance with claim 12 wherein said means for determining further comprises means for returning said voice channel transceiver identification to said one of at least two reuse lists of said at least one link list in accordance with a predetermined radio frequency reuse pattern and an association of said voice channel transceiver with a primary antenna.

14. A base site controller in accordance with claim 12 wherein said first means for recalling further comprises third means for recalling said voice channel transceiver identification from a preferred one of said at least two reuse lists.

15. A base site controller in accordance with claim 14 wherein said third means for recalling said voice channel transceiver identification further comprises fourth means for recalling on a first-in, first-out basis.

16. A base site controller in accordance with claim 11 wherein said first means for recalling a voice channel transceiver identification in at least one link list further comprises means for selecting a guard timing link list for said transceiver identification storage if said voice channel transceiver is in a guard timing mode and for selecting an idle channel link list for said transceiver identification storage if said voice channel transceiver is in an idle channel mode.

17. A base site controller in accordance with claim 11 wherein said means for selecting at least one available voice channel transceiver further comprises means for obtaining a representation of available voice channel transceivers in areas not serving the engaged remote unit.

18. A base site controller in accordance with claim 17 further comprising means for mapping said obtained representation into one of a plurality of predeterminedly selected geographic area patterns of available voice channel transceivers.

* * * * *